(12) United States Patent
Maeda et al.

(10) Patent No.: US 7,108,417 B2
(45) Date of Patent: Sep. 19, 2006

(54) LIGHTING APPARATUS AND LIQUID CRYSTAL DISPLAY

(75) Inventors: Satoshi Maeda, Kawasaki (JP); Hirokazu Aritake, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/010,128

(22) Filed: Dec. 10, 2004

(65) Prior Publication Data

US 2005/0117324 A1    Jun. 2, 2005

Related U.S. Application Data

(63) Continuation of application No. PCT/JP2003/02020, filed on Feb. 25, 2003.

(30) Foreign Application Priority Data

Aug. 23, 2002   (JP)   ............................. 2002-243188

(51) Int. Cl.
  *F21V 8/00*   (2006.01)
(52) U.S. Cl. .................. 362/626; 362/612; 362/623
(58) Field of Classification Search ............ 362/31, 362/26, 600, 611, 612, 624, 623, 626
  See application file for complete search history.

(56) References Cited

U.S. PATENT DOCUMENTS

| | | | |
|---|---|---|---|
| 5,664,862 A | 9/1997 | Redmond et al. | |
| 5,894,539 A | 4/1999 | Epstein | |
| 5,980,054 A | 11/1999 | Fukui et al. | |
| 6,068,382 A | 5/2000 | Fukui et al. | |
| 6,283,602 B1 | 9/2001 | Kawaguchi et al. | |
| 6,293,683 B1 | 9/2001 | Okada | |
| 6,672,734 B1 * | 1/2004 | Lammers | 362/612 |
| 6,799,860 B1 * | 10/2004 | Nakaoka et al. | 362/615 |
| 6,883,924 B1 * | 4/2005 | Maeda et al. | 362/612 |
| 2001/0017773 A1 | 8/2001 | Suzuki et al. | |

FOREIGN PATENT DOCUMENTS

| | | |
|---|---|---|
| CN | 2358336 | 1/2000 |
| EP | 0 866 264 | 9/1998 |
| EP | 0 969 311 | 1/2000 |
| EP | 1 288 702 | 3/2003 |
| EP | 1 367 430 | 12/2003 |

(Continued)

*Primary Examiner*—Laura. K. Tso
(74) *Attorney, Agent, or Firm*—Greer, Burns & Crain, Ltd

(57) ABSTRACT

A plurality of first light reflection parts 20a in the form of a first V-shaped groove, for reflecting light entering from a first light source 12a and a plurality of light reflection parts 20b in the form of a second V-shaped groove, for reflecting light entering from a second light source 12b are formed, an intersection angle $\theta_P$ of the planes of the first V-shaped groove and an intersection angle $\theta_P$ of the planes of the second V-shaped grooves are substantially equal to each other, the planes of said plurality of first light reflection parts and the planes of said plurality of second light reflection parts are tilted at respective angles at which the light exits in the direction substantially perpendicular to the longitudinal direction of the linear light conductor 14, said plurality of first light reflection parts are formed in at least a region near the end of the linear light conductor, opposite to the end thereof near which the first light source is disposed, and said plurality of second reflection parts are formed in at least a region near the end of the linear light conductor opposite to the end thereof near which the second light source is disposed.

8 Claims, 19 Drawing Sheets

FOREIGN PATENT DOCUMENTS

| | | |
|---|---|---|
| JP | 10-260405 | 9/1998 |
| JP | 2000-011723 | 1/2000 |
| JP | 2001-011723 | 1/2000 |
| JP | 2001-35227 | 2/2001 |
| JP | 3084161 | 12/2001 |
| JP | 2002-231035 | 8/2002 |

* cited by examiner

LIGHTING APPARATUS AND LIQUID CRYSTAL DISPLAY

CROSS REFERENCE TO RELATED APPLICATION

This application is a Continuation of PCT application No. PCT/JP2003/002020, which was filed on Feb. 25, 2003, and which designated the United States.

TECHNICAL FIELD

The present invention relates to a lighting apparatus and a liquid crystal display, more specifically, a lighting apparatus which can illuminate with a uniform intensity, and a liquid crystal display.

BACKGROUND ART

Liquid crystal panels, which are thin and light, are widely used as the display screens of portable information terminals.

The liquid crystal panels include transmission type liquid crystal panels and reflection type liquid crystal panels.

FIG. 15A is a sectional view of the transmission type liquid crystal panel. As illustrated in FIG. 15A, a polarizer 214 is sandwiched between a glass substrate 210 and a glass substrate 212. On the glass substrate 212, bus lines 216, etc. are formed. A liquid crystal 220 is sealed between the glass substrate 212 and a glass substrate 218. Color filters 224a, 224b, 224c are sandwiched between the glass substrate 218 and the glass substrate 222. A polarizer 228 is sandwiched between the glass substrate 222 and the glass substrate 226.

FIG. 15B is a sectional view of the reflection type liquid crystal panel. As illustrated in FIG. 15B, in the reflection type liquid crystal panel, a mirror 230 is sandwiched between the glass substrate 210 and the glass substrate 212. The mirror 230 is for reflecting light entering at the upper surface of the reflection type liquid crystal panel.

The Liquid crystal itself is not luminous, and illumination is necessary to see the information displayed on the liquid crystal panels.

In the transmission type liquid crystal panel, a lighting apparatus is disposed on the side of the lower side of the liquid crystal panel.

In the reflection type liquid crystal panel, no lighting apparatus is essentially required when the display screen is watched in environments with sun light or room lights. However, a lighting apparatus is required so that the display screen can be watched in environments without illumination. The lighting apparatus is disposed on the side of the upper side of the liquid crystal panel.

FIG. 16 is a perspective view of the proposed lighting apparatus. As illustrated in FIG. 16, the proposed lighting apparatus 110 includes LEDs 112a, 112b which emit light, a linear light conductor 114 which converts the light from the LEDs 112a, 112b to linear light to emit the linear light, and a plane light conductor 116 which converts the liner light emitted by the liner light conductor 114 to plane light to emit the plane light. On the rear side of the linear light conductor 114, i.e., the reflection side, a plurality of light reflecting parts 120 are formed in stripes. A reflection coat film 118 is formed on the reflection side of the linear light conductor 114.

FIGS. 17A and 17B are a perspective view and a plan view of the linear light conductor of the proposed lighting apparatus. As illustrated in FIGS. 17A and 17B, the light emitted by the LEDs 112a, 112b is reflected on the rear side of the linear light conductor 114, i.e., the plane of the light reflection parts 120 formed on the reflection side to be emitted at the front side of the linear light conductor 114, e.g., the exit side. The linear light emitted at the exit side of the linear light conductor 114 is converted to plane light by the plane light conductor 116 to be emitted at the plane of the plane light conductor 116.

In this proposed lighting apparatus, the liquid crystal panel can be illuminated in plane. Such lighting apparatus is described in, e.g., the specification of Japanese Patent Application Unexamined Publication No. Hei 10-260405.

However, the proposed lighting apparatus described above cannot illuminate the liquid crystal panel with a uniform light intensity distribution, as will be described below.

FIG. 18 is a graph of an intensity distribution of light emitted by the linear light conductor of the proposed lighting apparatus. Positions from the center of the linear light conductor 114 are taken on the horizontal axis, and on the vertical axis, light intensities are taken.

As indicated in FIG. 18, in the proposed lighting apparatus, the intensity distribution of the light exiting from the linear light conductor 114 is not uniform and has parts of high intensities and parts of low intensities. An intensity distribution of the light emitted by the linear light conductor 114 is reflected in an intensity distribution of the light emitted by the planar light conductor 116. Accordingly, the intensity distribution of the light emitted by the planar light conductor 116 is not uniform and has parts of high light intensities and parts of low light intensities. Accordingly, the liquid crystal display using the proposed lighting apparatus cannot have good display characteristics.

An object of the present invention is to provide a lighting apparatus which can illuminate with a uniform light intensity, and a liquid crystal display using the lighting apparatus, which has good display characteristics.

DISCLOSURE OF THE INVENTION

The above-described object is achieved by a lighting apparatus comprising a first light source, a second light source spaced from the first light source, and a linear light conductor disposed between the first light source and the second light source, for causing light entering from the first light source and the second light source to exit linearly from an exit side, on the reflection side of the linear light conductor, which is opposed to the exit side, a plurality of first light reflection parts in the form of a first V-shaped groove, for reflecting light entering from the first light source and a plurality of second light reflection parts in the form of a second V-shaped groove, for reflecting light entering from the second light source being formed, and an intersection angle of the planes of the first V-shaped groove and an intersection angle of the planes of the second V-shaped grooves being substantially equal to each other, the planes of said plurality of first light reflection parts being tilted at respective angles at which the light entering from the first light source exits in the direction substantially perpendicular to the longitudinal direction of the linear light conductor, and the planes of said plurality of second light reflection parts being tilted at respective angles at which the light entering from the second light source exits in the direction substantially perpendicular to the longitudinal direction of the linear light conductor, and said plurality of first light reflection parts being formed in at least a region near the end of the linear light conductor, opposite to the end thereof near which the first light source is disposed, and said plurality of second reflection parts being formed in at least a region near the end of the linear light conductor opposite to the end thereof near which the second light source is disposed.

The above-described object is achieved by a liquid crystal display comprising a lighting apparatus including a first light source, a second light source spaced from the first light source, a linear light conductor disposed between the first light source and the second light source, for causing light entering from the first light source and the second light source to exit linearly from an exit side, and a planar light conductor optically connected to the linear light conductor, for emitting light entering from the linear light conductor in plane; and a liquid crystal panel illuminated by the lighting apparatus, on the reflection side of the linear light conductor, which is opposed to the exit side, a plurality of first light reflection parts in the form of first V-shaped grooves, for reflecting light entering from the first light source and a plurality of light reflection parts in the form of second V-shaped grooves, for reflecting light entering from the second light source being formed, and an intersection angle of the planes of the first V-shaped groove and an intersection angle of the planes of the second V-shaped grooves being substantially equal to each other, the planes of said plurality of first light reflection parts being tilted at respective angles at which the light entering from the first light source exits in the direction substantially perpendicular to the longitudinal direction of the linear light conductor, and the planes of said plurality of second light reflection parts being tilted at respective angles at which the light entering from the second light source exits in the direction substantially perpendicular to the longitudinal direction of the linear light conductor, and said plurality of first light reflection parts being formed in at least a region near the end of the linear light conductor, opposite to the end thereof near which the first light source is disposed, and said plurality of second reflection parts being formed in at least a region near the end of the linear light conductor opposite to the end thereof near which the second light source is disposed.

According to the present invention, the first light reflection parts for emitting the light from the first light source in the direction perpendicular to the longitudinal direction of the linear light conductor are formed in at least a region near the end of the linear light conductor opposite to the side of the linear light conductor where the first light source is disposed, and the second light reflection parts for emitting the light from the second light source in the direction perpendicular to the longitudinal direction of the linear light conductor are formed in at least a region near the end of the linear light conductor opposite to the side of the linear light conductor where the second light source is disposed. Thus, in the present invention, near the first light source, the light from the second light source can be reflected by the second light reflection parts, and near the second light source, the light from the first light source can be reflected by the first light reflection parts. Accordingly, even when the first light reflection parts and the second light reflection parts are formed in V-shaped grooves whose intersection angles $\theta_P$ are equal to each other, decrease of a light intensity in regions near the ends of the linear light conductor can be suppressed. Thus, according to the present embodiment, the light intensity distribution can be made further uniform, and good display characteristics can be realized.

BEST MODES FOR THE CARRYING OUT THE INVENTION (A First Embodiment)

Figure 1A:
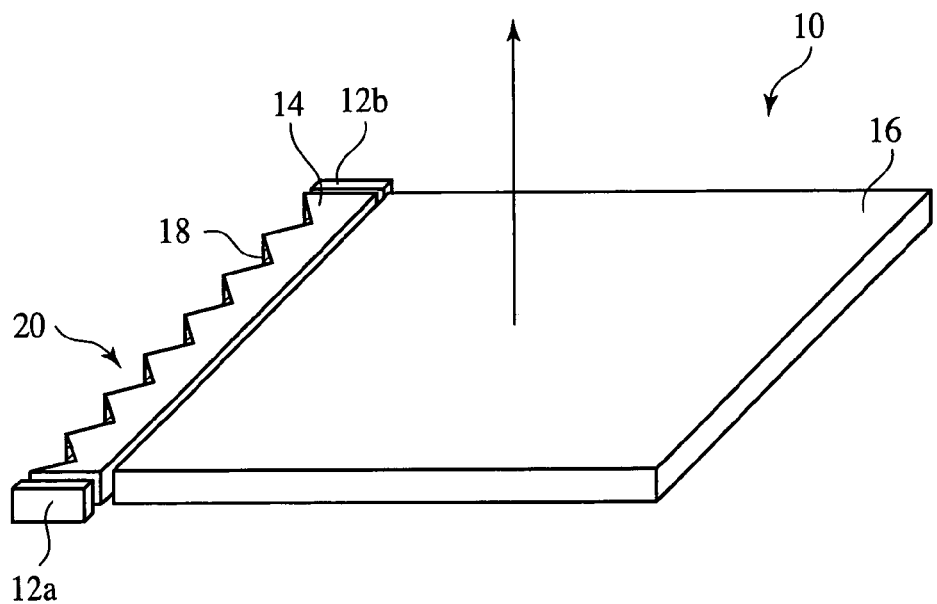
FIGS. 1A and 1B are a perspective view and a plan view of the lighting apparatus according to a first embodiment of the present invention.
Figure 1B:
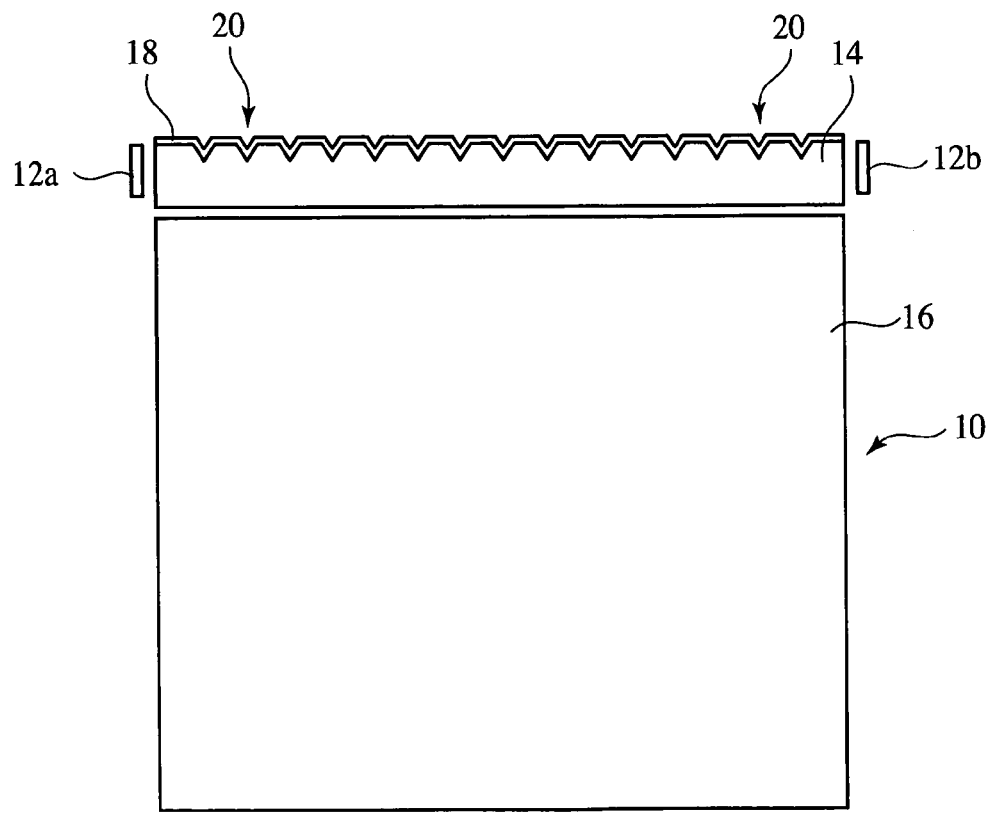
Figure 2:
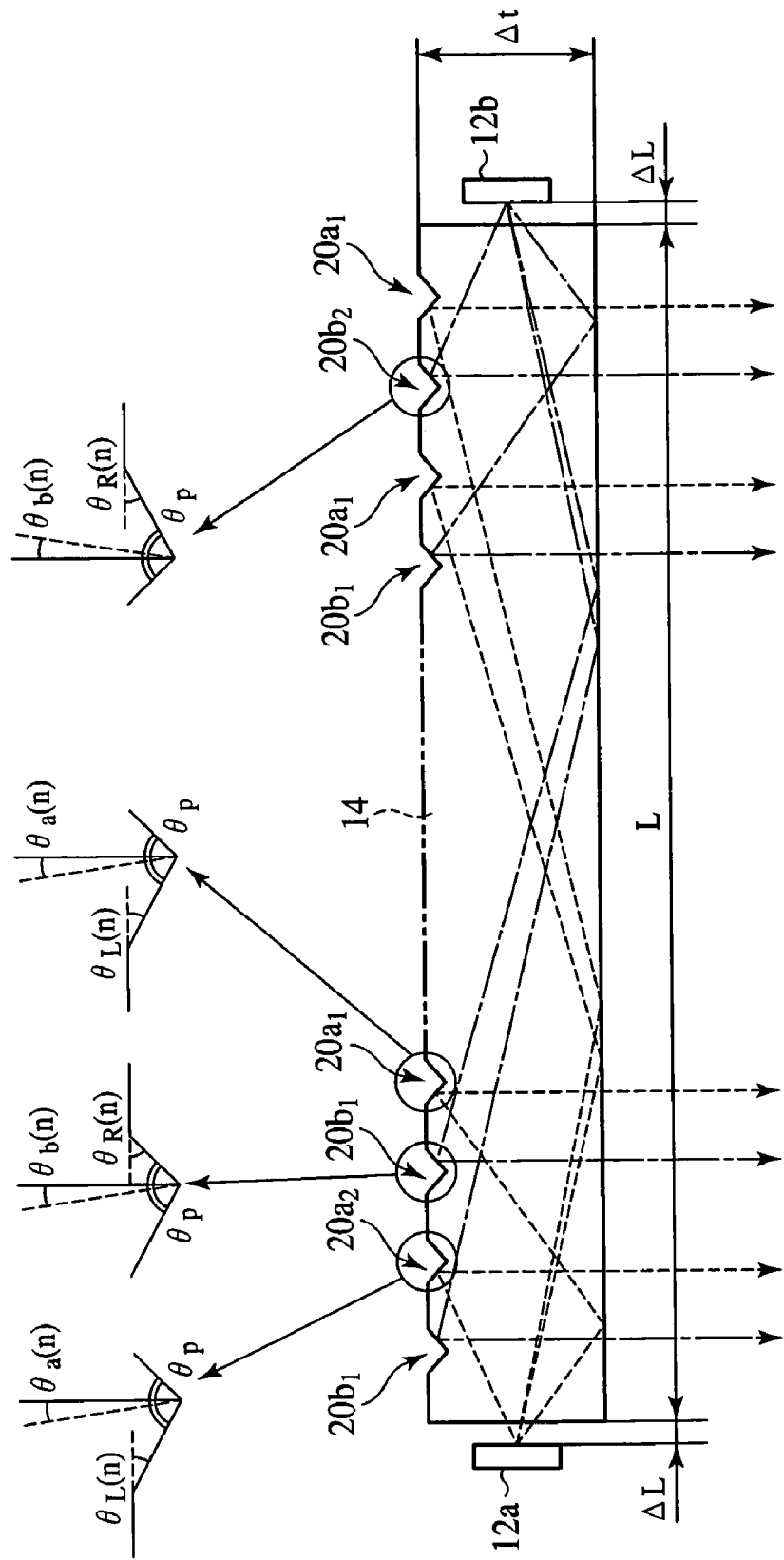
FIG. 2 is a plan view of the lighting apparatus according to the first embodiment of the present invention.
Figure 3:
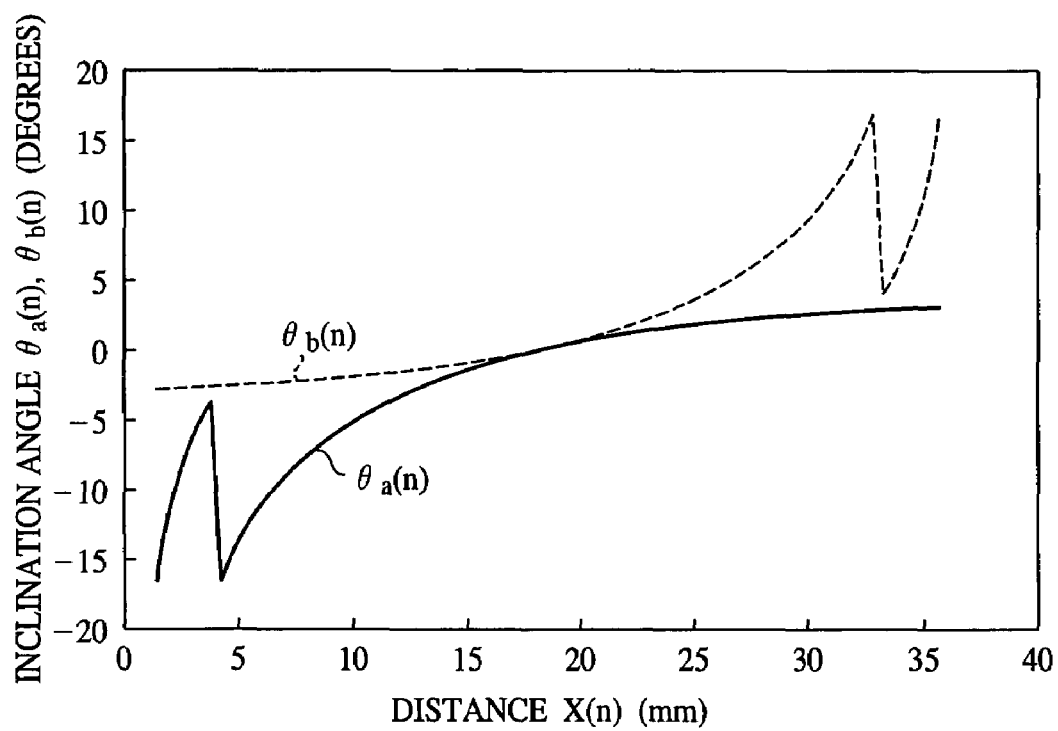
FIG. 3 is a graph exemplifying inclination angles of the planes of the light reflection parts of the lighting apparatus according to the first embodiment of the present invention.
Figure 4:
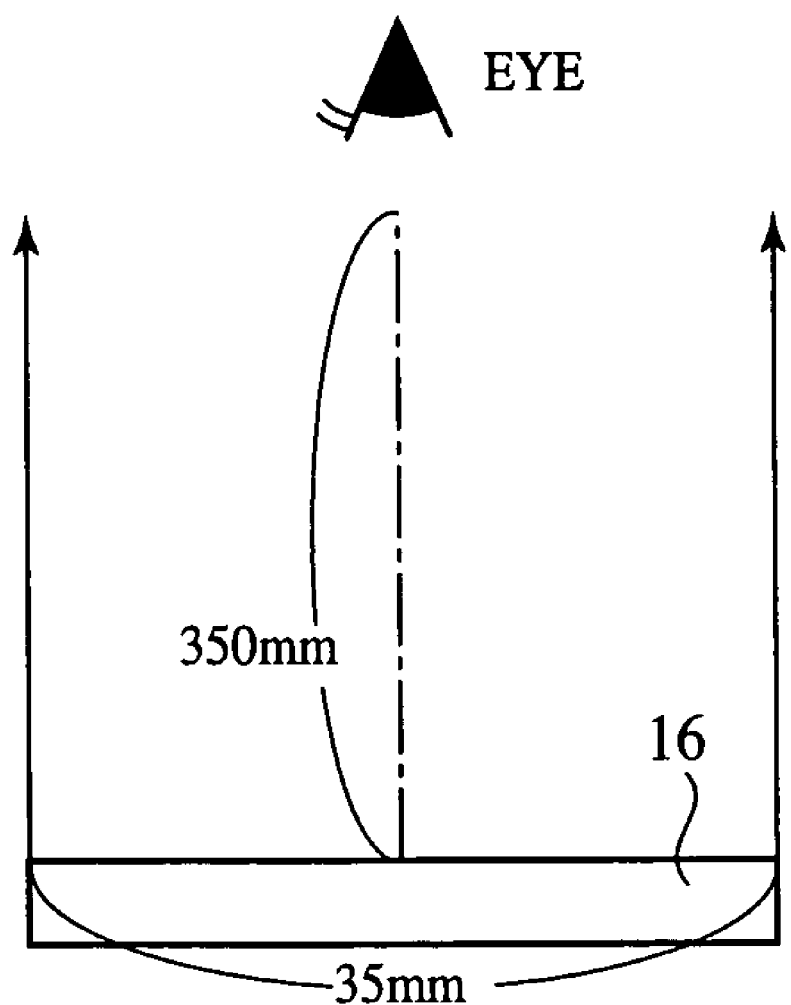
FIG. 4 is a schematic view of relationships between the human eyes and the display screen.
Figure 5:
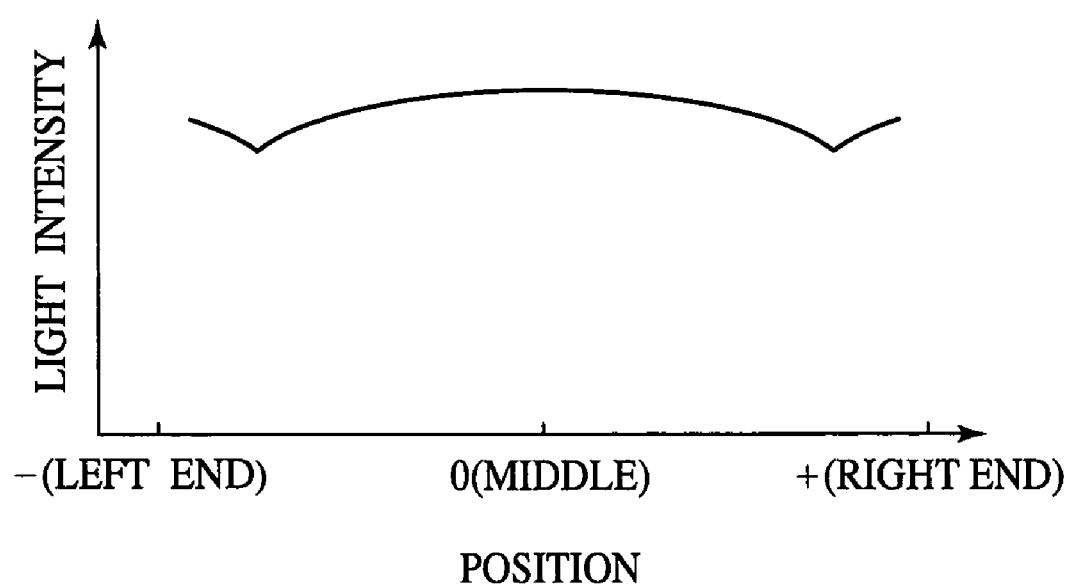
FIG. 5 is a graph of the light intensity distribution of the lighting apparatus according to the first embodiment of the present invention.

The lighting apparatus according to a first embodiment of the present invention will be explained with reference to FIGS. 1A to 5. FIGS. 1A and 1B are a perspective view and a plan view of the lighting apparatus according to the present embodiment. FIG. 1A is a perspective view of the lighting apparatus according to the present embodiment. FIG. 1B is a plan view of the lighting apparatus according to the present embodiment. FIG. 2 is a plan view of the lighting apparatus according to the present embodiment. FIG. 3 is a graph of inclination angles of the light reflection parts of the lighting apparatus according o the present embodiment. FIG. 4 is a schematic view of relationships between the human eyes and the display screen. FIG. 5 is a graph of the light intensity distribution of the lighting apparatus according to the present embodiment.

As illustrated in FIGS. 1A and 1B, the lighting apparatus 10 according to the present embodiment comprises LEDs 12a, 12b which emit light, a linear light conductor 14 which converts the light entering from the LEDs 12a, 12b to linear light and emit the linear light, and a plane light conductor 16 optically connected to the linear light conductor 14, which converts the linear light to plane light and emits the plane light. A reflection coat film 18 is formed on the reflection side of the linear light conductor 14.

The LED 12a is disposed at the left end of the linear light conductor 14 as viewed in the drawing. The LED 12b is disposed at the right end of the linear light conductor 14 as viewed in the drawing. The respective distances ΔL (see FIG. 2) between the LEDs 12a, 12b and the linear light conductor 14 are set at, e.g., 0 mm.

The linear light conductor 14 is formed generally in a square pole. The linear light conductor 14 is formed of, e.g., glass or plastics. The refractive index Ng of the linear light conductor 14 is, e.g., 1.51. The thickness t of the linear light conductor 14 is set at, e.g., 3 mm. The length L of the linear light conductor 14 is set at, e.g., 37 mm for the lighting apparatus for use in a 2-inch liquid crystal display. The width of the display screen of the 2-inch liquid crystal display is about 35 mm, and when the length L of the linear light conductor 14 is set at 37 mm, a 2 mm-margin can be ensured.

On the reflection side of the linear light conductor 14, a plurality of light reflection parts 20a, 20b are formed in stripes. The light reflection parts 20a, 20b are formed in V-shaped grooves. As illustrated in FIG. 2, the intersecting angles $\theta_P$ of the planes of the V-shaped grooves forming the light reflection parts 20a, 20b are all equal to each other. The intersection angles $\theta_P$ of the planes of the V-shaped grooves forming the light reflection parts 20a, 20b are all equal to each other so that the die, etc. for casting the linear light conductor can be formed with 1 kind of cutting tool. The die, etc. for casting the linear light conductor can be thus prepared at low costs, which leads to low costs of the linear light conductor.

The light reflection parts 20a are for reflecting light entering the linear light conductor 14 from the LED 12a on the left side as viewed in the drawing and emitting the light at the exit side of the linear light conductor 14. On the left side of the middle of the linear light conductor 14 as viewed in the drawing, the light reflection parts 20a are formed, e.g., at the even number-th parts counted from the left side of the linear light conductor 14 as viewed in the drawing. On the right side of the middle of the linear light conductor 14 as viewed in the drawing, the light reflection parts 20a are formed at, e.g., the odd number-th parts counted from the left side of the linear light conductor 14 as viewed in the drawing.

The light reflection parts 20b are for reflecting light entering the linear light conductor 14 from the LED 12b on the right side as viewed in the drawing and emitting the light at the exit side of the linear light conductor 14. On the left side of the middle of the linear light conductor 14 as viewed in the drawing, the light reflection parts 20b are formed, e.g., at the odd numbered parts counted from the left side of the linear light conductor 14 as viewed in the drawing. On the right side of the middle of the linear light conductor 14 as viewed in the drawing, the light reflection parts 20b are formed at, e.g., the even numbered parts counted from the left side of the linear light conductor 14 as viewed in the drawing.

The light reflection parts 20a, 20b are formed on the reflection side of the linear light conductor 14 respectively in large numbers, but they are omitted in FIG. 2.

The light reflection parts 20a, 20b are formed alternately at, e.g., a 0.23 mm-pitch. In total 150, for example, of the light reflection parts 20a, 20b are formed.

Of the light reflection parts 20a, the light reflection parts $20a_1$ are formed at parts where the light entering the linear light conductor 14 from the LED 12a on the left side as viewed in the drawing is totally reflected on the surface of the linear light conductor 14 on the exit side and enters the light reflection parts 20a, i.e., where the total reflection conditions are satisfied.

Of the light reflection parts 20a, the light reflection parts $20a_2$ are formed at parts where the light entering the linear light conductor 14 from the LED 12a on the left side as viewed in the drawing is totally reflected on the surface of the linear light conductor 14 on the exit side and does not enter the light reflection parts 20a, i.e., where the total reflection conditions are not satisfied.

An inclination angle $\theta_L(n)$ of the planes of each light reflection part $20a_1$ on the left side as viewed in the drawing is set so that the light entering from the LED 12a on the left side as viewed in the drawing is totally reflected on the plane of the linear light conductor 14 on the exit side and further totally reflected on the planes of the light reflection part $20a_1$ on the left side as viewed in the drawing to exit in the direction perpendicular to the longitudinal direction of the linear light conductor 14.

In other words, the light reflection parts $20a_1$ are tilted at respective inclination angles $\theta_a(n)$ so that light entering from the LED 12a on the left side as viewed in the drawing is totally reflected on the surface of the linear light conductor 14 on the exit side, further totally reflected on the planes of the light reflection parts $20a_1$ on the left side as viewed in the drawing, and exits in the direction perpendicular to the longitudinal direction on the liner light conductor 14.

The inclination angle $\theta_a(n)$ of each light reflection part $20a_1$ is an inclination angle of the light reflection part $20a_1$ itself, specifically an angle at which the bisector of the intersection angle $\theta_p$ of the planes of the V-shaped groove forming the light reflection part $20a_1$ is tilted to the direction normal to the longitudinal direction of the linear light conductor 14.

An inclination angle $\theta_L(n)$ of the plane of each light reflection part $20a_1$ is expressed by the following formula.

$$\theta_L(n) = \frac{\tan^{-1}\left(\frac{\Delta L + X(n)}{\frac{3}{2}t}\right)}{2} \tag{1}$$

In Formula 1, n means the n-th light reflection part. $\theta_L(n)$ denotes an inclination angle of the plane of the n-th light reflection part $20a_1$ on the left side as viewed in the drawing. X(n) denotes a distance from the end surface of the linear light conductor 14 on the left side as viewed in the drawing to the n-th light reflection part.

Formula 1 expresses the inclination angles $\theta_L(n)$ of the planes of the light reflection parts $20a_1$ on the left side of the middle of the linear light conductor 14 as viewed in the drawing. The expression for inclination angles $\theta_L(n)$ of the planes of the light reflection parts $20a_1$ on the right side of the middle of the linear light conductor 14 as viewed in the drawing is omitted here.

When Formula 1 is transformed, the inclination angle $\theta_a(n)$ of each light reflection part $20a_1$ is expressed by the following formula.

$$\theta_a(n) = \theta_0 - \frac{\tan^{-1}\left(\frac{\Delta L + X(n)}{\frac{3}{2}t}\right)}{2} \quad (2)$$

$\theta_0$ denotes an inclination angle of the planes of each reflection part 20, at which when the light reflection part 20 is formed at the middle of the linear light conductor 13, the light exit in the direction perpendicular to the longitudinal direction of the linear light conductor 14. $\theta_0$ is expressed by the following formula.

$$\theta_0 = \frac{180° - \theta_P}{2} \quad (3)$$

Respective inclination angles $\theta_L(n)$ of the light reflection parts $20a_2$ of the plane of the light conductor parts $20a_2$ on the left side as viewed in the drawing are set so that the light entering the linear light conductor 14 from the LED 12a on the left side as viewed in the drawing is incident directly on the planes of the light reflection parts $20a_2$ on the left side as viewed in the drawing without being totally reflected on the plane of the linear light conductor 14 on the exit side, totally reflected on the planes of the light reflection parts $20a_2$ on the left side as viewed in the drawing, and exit in the direction perpendicular to the longitudinal direction of the linear light conductor 14.

In other words, the light reflection parts $20a_2$ are tilted at respective inclination angles $\theta_a(n)$ so that the light entering the linear light conductor 14 from the LED 12a on the left side as viewed in the drawing is incident directly on the planes of the light reflection parts $20a_2$ on the left side as viewed in the drawing without being totally reflected on the plane of the linear light conductor 14 on the exit side, totally reflected on the planes of the light reflection parts $20a_2$ on the left side as viewed in the drawing, and exit in the direction perpendicular to the longitudinal direction of the linear light conductor 14.

The inclination angle $\theta_a(n)$ of light reflection part $20a_2$ is an inclination angle of the light reflection part $20a_2$ itself, specifically an angle at which the bisector of the intersection angle $\theta_p$ of the planes of the V-shaped groove forming the light reflection part $20a_2$ is tilted to the direction normal to the longitudinal direction of the linear light conductor 14.

An inclination angle $\theta_L(n)$ of the plane of light reflection part $20a_2$ is expressed by the following formula.

$$\theta_L(n) = \frac{\tan^{-1}\left(\frac{\Delta L + X(n)}{\frac{1}{2}t}\right)}{2} \quad (4)$$

Formula 4 expresses an inclination angle $\theta_L(n)$ of the plane of light reflection part $20a_2$ on the left side of the middle of the linear light conductor 14 as viewed in the drawing. The expression for inclination angle $\theta_L(n)$ of the plane of the light reflection part $20a_2$ on the right side of the middle of the linear light conductor 14 as viewed in the drawing is omitted here.

When Formula 4 is transformed, an inclination angle $\theta_a(n)$ of each light reflection part $20a_2$ is expressed by the following formula.

$$\theta_a(n) = \theta_0 - \frac{\tan^{-1}\left(\frac{\Delta L + X(n)}{\frac{1}{2}t}\right)}{2} \quad (5)$$

Of the light reflection parts 20b, the light reflection parts $20b_1$ are formed at parts where the light entering the linear light conductor 14 from the LED 12b on the right side as viewed in the drawing is totally reflected on the plane of the linear light conductor 14 on the exit side and enters the light reflection parts 20b, i.e., where the total reflection conditions are satisfied.

Of the light reflection parts 20b, the light reflection parts $20b_2$ are formed at parts where the light entering the linear light conductor 14 from the LED 12b on the right side as viewed in the drawing is totally reflected on the surface of the linear light conductor 14 on the exit side and does not enter the light reflection parts 20b, i.e., where the total reflection conditions are not satisfied.

Respective inclination angles $\theta_R(n)$ of the planes of light reflection parts $20b_1$ on the right side as viewed in the drawing are set so that the light entering the plane of the light reflection parts $20b_1$ on the right side as viewed in the drawing from the LED 12b on the right side as viewed in the drawing is totally reflected on the plane of the linear light conductor 14 on the exit side and is further totally reflected on the planes of the light reflection parts $20b_1$ on the right side as viewed in the drawing to exit in the direction perpendicular to the longitudinal direction of the linear light conductor 14.

In other words, the light reflection parts $20b_1$ are tilted at respective inclination angles $\theta_b(n)$ at which the light entering the planes of the light reflection parts $20b_1$ on the right side as viewed in the drawing directly from the LED 12b on the right side as viewed in the drawing is totally reflected on the plane of the linear light conductor 14 on the exit side and totally reflected further on the planes of the light reflection parts $20b_1$ on the right side as viewed in the drawing to exit in the direction perpendicular to the longitudinal direction of the linear light conductor 14.

The inclination angle $\theta_b(n)$ of each light reflection part $20b_1$ is an inclination angle of the light reflection part $20b_1$ itself, specifically, an angle at which the bisector of the intersection angle $\theta_p$ of the planes of the V-shaped groove forming the light reflection part $20b_1$ is tilted to the direction normal to the longitudinal direction of the linear light conductor 14.

An inclination angle $\theta_R(n)$ of the plane of the light reflection $20b_1$ is expressed by the following formula.

$$\theta_R(n) = \frac{\tan^{-1}\left(\frac{\Delta L + (L - X(n))}{\frac{3}{2}t}\right)}{2} \quad (6)$$

Formula 6 expresses an inclination angle $\theta_R(n)$ of the plane of light reflection part $20b_1$ on the left side of the middle of the linear light conductor 14 as viewed in the drawing. The expression of an inclination angle $\theta_R(n)$ of the plane of each light reflection parts $20b_1$ on the right side of the middle of the linear light conductor 14 as viewed in the drawing is omitted.

When Formula 6 is transformed, an inclination angle $\theta_b(n)$ of each light reflection part $20b_1$ is expressed by the following formula.

$$\theta_b(n) = \theta_0 - \frac{180° - \left[\theta_p + \tan^{-1}\frac{\Delta L + (L - X(n))}{\frac{3}{2}t}\right]}{2} \quad (7)$$

Respective inclination angles $\theta_R(n)$ of the light reflection parts $20b_2$ on the right side as viewed in the drawings are set so that the light entering the linear light conductor 14 from the LED 12b on the right side as viewed in the drawing directly enters the plane of the light reflection part $20b_2$ on the right side as viewed in the drawing without being totally reflected on the surface of the linear light conductor 14 on the exit side and totally reflected on the planes of the light reflection parts $20b_2$ on the right side as viewed in the drawing to exit in the direction perpendicular to the longitudinal direction of the linear light conductor 14.

In other words, the light reflection parts $20b_2$ are tilted at respective inclination angles $\theta_R(n)$ at which the light entering the linear light conductor 14 from the LED 12b on the right side as viewed in the drawing directly enters the planes of the light reflection parts $20b_2$ on the right side as viewed in the drawing without being totally reflect on the surface of the linear light conductor 14 on the exit side and totally reflected on the planes of the light reflection parts $20b_2$ on the right side as viewed in the drawing to exit in the direction perpendicular to the longitudinal direction of the linear light conductor 14.

The inclination angle $\theta_b(n)$ of each light reflection part $20b_2$ is an inclination angle of the light reflection part $20b_2$ itself, specifically, an angle at which the bisector of an intersection angle $\theta_p$ of the planes of the V-shaped groove forming the light reflection part $20b_2$ to the direction normal to the longitudinal direction of the linear light conductor 14.

The formula expressing the inclination angle $\theta_R(n)$ of the plane of light reflection part $20b_2$ is omitted here. The formula expressing the inclination angle $\theta_R(n)$ of light reflection part $20b_2$ is also omitted here.

Then, examples of specific set values of the inclination angles $\theta_a(n)$, $\theta_b(n)$ of the light reflection parts 20a, 20b of the present embodiment will be explained with reference to FIG. 3. FIG. 3 is a graph of the examples of the inclination angles $\theta_a(n)$, $\theta_b(n)$ of the light reflection parts of the lighting apparatus according to the present embodiment. On the horizontal axis, distances X(n) from the end surface of the linear light conductor 14 to the light reflection parts 20a, 20b are taken, and inclination angles $\theta_a(n)$, $\theta_b(n)$ of the light reflecting parts 20a, 20b are taken on the vertical axis.

Here, the screen sized was 2 inches; the width of the display screen was 35 mm; the total number of the light reflection parts 20a, 20b was 150; the pitch of the light reflection parts 20a, 20b was 0.23 mm; the intersection angle $\theta_p$ of the planes of the V-shaped groove forming light reflection part was 103.8 degrees; the thickness t of the linear light conductor 14 was 3 mm; the length L of the linear light conductor 14 was 37 mm; the distance $\Delta L$ between the LEDs 12a, 12b and the linear light conductor 14 was 0 mm; the refractive index of the linear light conductor 14 was 1.51, and the distance between the eyes of a person watching the screen and the display screen (see FIG. 4) was 350 mm.

When inclination angles $\theta_a(n)$, $\theta_b(n)$ of the light reflection parts 20a, 20b are set as illustrated in FIG. 3, the light intensity distribution as illustrated in FIG. 5 can be provided. FIG. 5 is a graph of the light intensity distribution of the lighting apparatus according to the present embodiment. On the horizontal axis, positions in the liner light conductor are taken, and light intensities are taken on the vertical axis.

As seen in FIG. 5, the lighting apparatus according to the present embodiment can provide a substantially uniform light intensity distribution.

As described above, the lighting apparatus according to the present embodiment is characterized mainly in that the light reflection parts 20a, 20b are formed in V-shaped grooves whose intersection angles $\theta_p$ are equal to each other, and the light reflection parts 20a which emit the light entering from the LED 12a in the direction perpendicular to the longitudinal direction of the linear light conductor 14, and the light reflection parts 20b which emit the light entering from the light from the LED 12b in the direction perpendicular to the longitudinal direction of the linear light conductor 14 are alternately formed.

Figure 19:
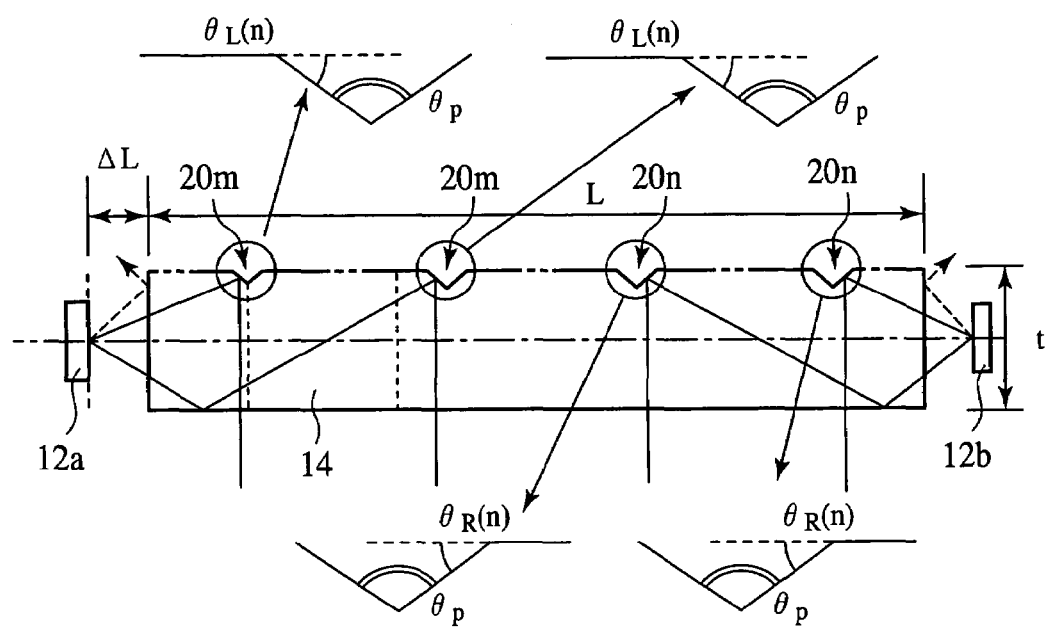
FIG. 19 is a plan view of the proposed lighting apparatus.

In the specification of Japanese Patent Application No. 2001-263922, the lighting apparatus illustrated in FIG. 19 is proposed. In the proposed lighting apparatus illustrated in FIG. 19, on the side where an LED 12a is disposed, light reflection parts 20m for emitting the light entering from the LED 12a in the direction substantially perpendicular to the longitudinal direction of a linear light conductor 14 are formed. On the side where an LED 12b is disposed, light reflection parts 20n for emitting the light entering from the LED 12b in the direction substantially perpendicular to the longitudinal direction of the linear light conductor 14 are formed. In the lighting apparatus illustrated in FIG. 19, the light from the LED 12a does not arrive at the light reflection parts 20m formed at positions near the LED 12a, and the light from the LED 12b does not arrive at the light reflection parts 20n formed at positions near the LED 12b. Accordingly, the light emitted from near the ends of the linear light conductor 14 has the intensity lowered. The light from the LED 12a does not arrive at the light reflection parts 20m formed at positions near the LED 12a, and the light from the LED 12b does not arrive at the light reflection parts 20n formed at positions near the LED 12b, because, as indicated by the dot line in FIG. 19, the light is totally reflected on the end portions of the linear light conductor 14.

In the present embodiment, however, in which the light reflection parts 20a for emitting the light entering from the LED 12a in the direction perpendicular to the longitudinal direction of the linear light conductor 14, and the light reflection parts 20b for emitting the light entering from the LED 12b in the direction perpendicular to the longitudinal direction of the linear light conductor 14 are alternately formed, the light entering from the LED 12b can be reflected by the light reflection parts 20b at positions near the LED 12a, and at positions near the LED 12b, the light entering from the LED 12a can be reflected by the light reflection parts 20a. Thus, according to the present embodiment, even when the light reflection parts 20a, 20b are formed in V-shaped grooves having the same intersection angle $\theta_p$, the decrease of the light intensity in the regions near the ends of the linear light conductor 14 can be suppressed. Thus, according to the present embodiment, the light intensity distribution can be made further uniform, and good display characteristics can be realized.

(A Second Embodiment)

Figure 6:
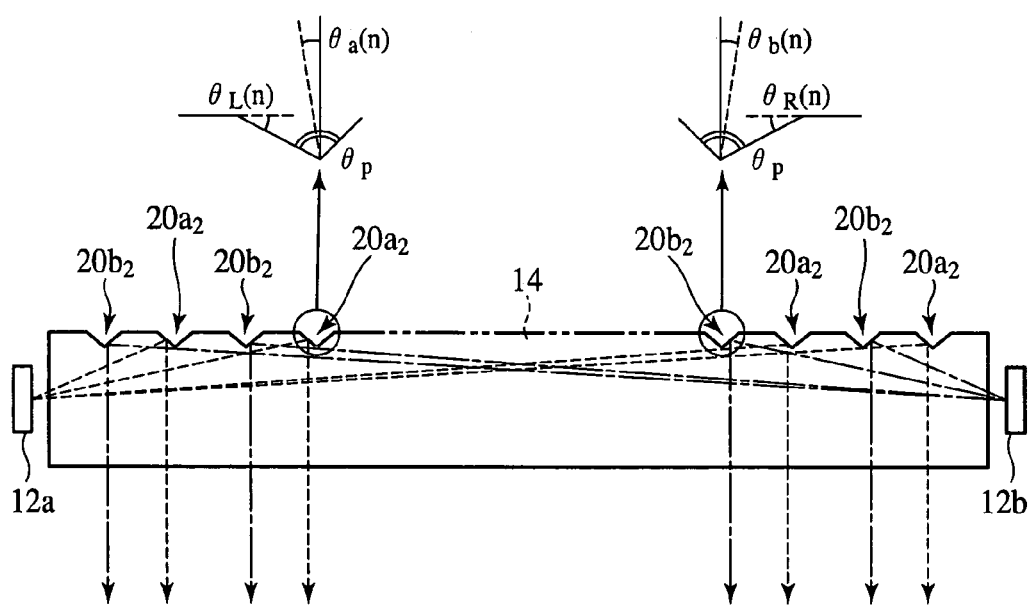
FIG. 6 is a plan view of the lighting apparatus according to a second embodiment of the present invention.
Figure 7:
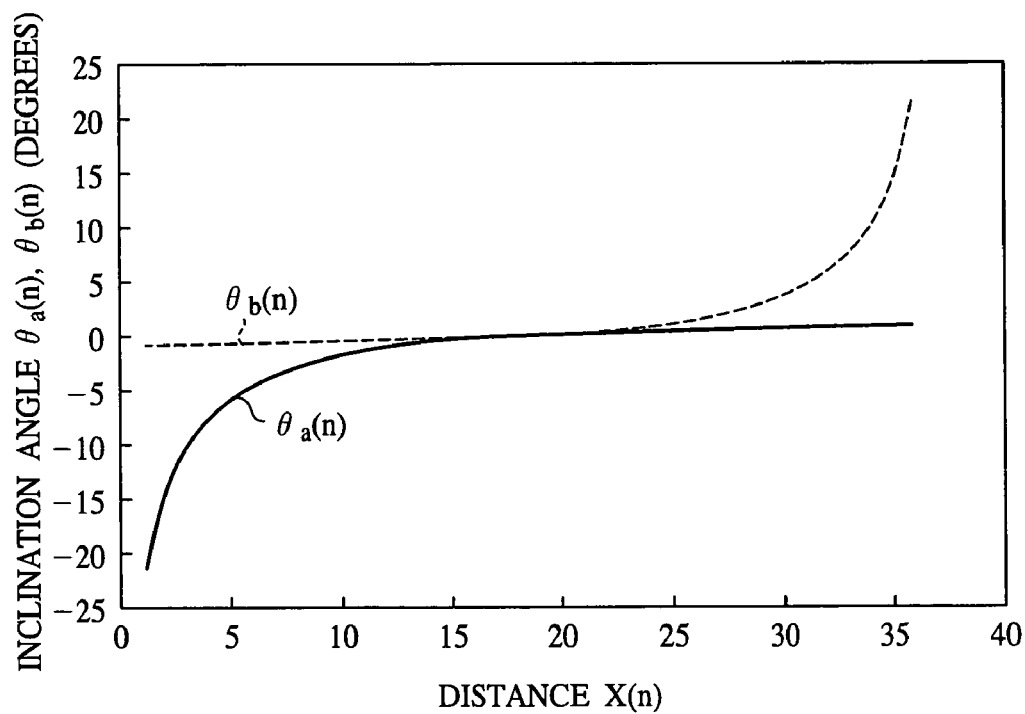
FIG. 7 is a graph exemplifying the inclination angles of the planes of the light reflection parts of the lighting apparatus according to the second embodiment of the present invention.
Figure 8:
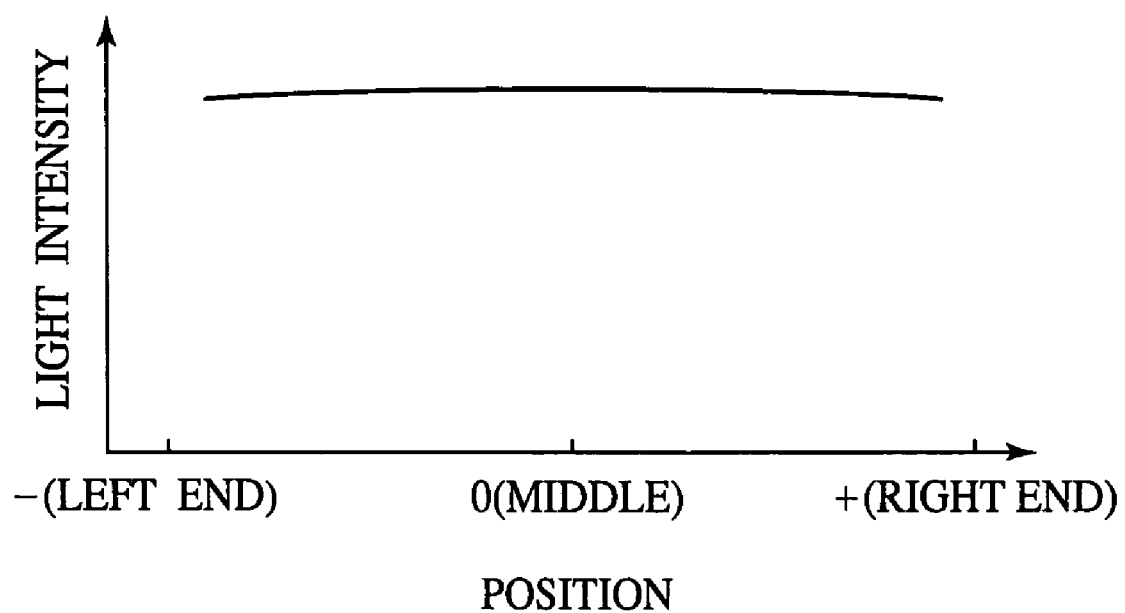
FIG. 8 is a graph of the light intensity distribution of the lighting apparatus according to the second embodiment of the present invention.

The lighting apparatus according to a second embodiment of the present invention will be explained with reference to FIGS. 6 to 8. FIG. 6 is a plan view of the lighting apparatus according to the present embodiment. FIG. 7 is a graph of inclination angles of light reflection parts of the lighting apparatus. FIG. 8 is a graph of the light intensity distribution of the lighting apparatus according to the present embodiment. The same members of the present embodiment as those of the lighting apparatus according to the first embodiment illustrated in FIGS. 1A to 5 are represented by the same reference numbers not to repeat or to simplify their explanation.

The lighting apparatus according to the present embodiment is characterized mainly in that only the light reflection parts $20a_2$, $20b_2$ are formed on the reflection side of the linear light conductor 14, and the light reflection parts $20a_1$, $20b_1$ (see FIG. 2) are not formed.

As illustrated in FIG. 6, a plurality of light reflection parts $20a_2$, $20b_2$ are formed in stripes on the reflection side of the linear light conductor 14.

The light reflection parts $20a_2$, $20b_2$ are formed respectively in a plural number on the reflection side of the linear light conductor 14 but are not all illustrated.

As described above, respective inclination angles $\theta_L(n)$ of the light reflection parts $20a_2$ are set so that the light entering directly on the planes of the light reflection parts $20a_2$ on the left side as viewed in the drawing from an LED 12a on the left side as viewed in the drawing is totally reflected on the plane of the light reflection parts $20a_2$ as viewed in the drawing to exit in the direction perpendicular to the longitudinal direction of the linear light conductor 14.

An inclination angle $\theta_L(n)$ of the plane of light reflection part $20a_2$ can be expressed by Formula 4 described above.

An inclination angle $\theta_a(n)$ of light reflection part $20a_2$ can be expressed by Formula 5 described above.

Respective inclination angles $\theta_R(n)$ of the planes of the light reflection parts $20b_2$ on the right side as viewed in the drawing are set so that the light entering directly the planes of the light reflection parts $20b_2$ on the right side as viewed in the drawing from an LED 12b disposed on the right side as viewed in the drawing is totally reflected on the planes of the light reflection parts $20b_2$ on the right side as viewed in the drawing to exit in the direction perpendicular to the longitudinal direction of the linear light conductor 14.

An inclination angle $\theta_R(n)$ of the plane of each light reflection part $20b_2$ is expressed by the following formula.

$$\theta_R(n) = \frac{\tan^{-1}\left(\frac{\Delta L + (L - X(n))}{\frac{1}{2}t}\right)}{2} \quad (8)$$

Formula 8 expresses an inclination angle $\theta_R(n)$ of the plane of light reflection parts $20b_2$ on the left side of the middle of the linear light conductor 14 as viewed in the drawing. The formula expressing an inclination angle $\theta_R(n)$ of the plane of light reflection parts $20b_2$ on the right side of the middle of the linear light conductor 14 as viewed in the drawing is omitted.

When Formula 8 is transformed, an inclination angle $\theta_b(n)$ of the light reflection parts $20b_2$ is expressed by the following formula.

$$\theta_b(n) = \theta_0 - \frac{180° - \left[\theta_p + \tan^{-1}\frac{\Delta L + (L - X(n))}{\frac{1}{2}t}\right]}{2} \quad (9)$$

Next, examples of specific set values of the inclination angles $\theta_a(n)$, $\theta_b(n)$ of the light reflection parts $20a_2$, $20b_2$ of the present embodiment will be explained with reference to FIG. 7. FIG. 7 is a graph of the examples of the inclination angles $\theta_a(n)$, $\theta_b(n)$ of the light reflection parts of the lighting apparatus according to the present embodiment. On the horizontal axis, distances $X(n)$ from the end surface of the linear light conductor 14 to the light reflection parts $20a_2$, $20b_2$ are taken, and inclination angles $\theta_a(n)$, $\theta_b(n)$ of the light reflection parts $20a_2$, $20b_2$ are taken on the vertical axis.

In the present embodiment as well, the screen size was 2 inches; the width of the display screen was 35 mm; the total number of the light reflection parts $20a$, $20b$ was 150; the pitch of the light reflection parts $20a$, $20b$ was 0.23 mm; the intersection angle of the planes of the V-shaped groove forming light reflection part was 103.8 degrees; the thickness t of the linear light conductor 14 was 3 mm; the length L of the linear light conductor 14 was 37 mm; the distance $\Delta L$ between the LEDs 12a, 12b and the linear light conductor 14 was 0 mm; the refractive index of the linear light conductor 14 was 1.51, and the distance between the eyes of a person watching the screen and the display screen was 350 mm.

When inclination angles $\theta(n)$ of the light reflection parts $20a_2$, $20b_2$ are set as illustrated in FIG. 7, the light intensity distribution as illustrated in FIG. 8 can be provided. FIG. 8 is a graph of the light intensity distribution of the lighting apparatus according to the present embodiment. On the horizontal axis, positions in the liner light conductor are taken, and light intensities are taken on the vertical axis.

As seen in FIG. 8, the lighting apparatus according to the present embodiment can provide a further uniform light intensity distribution.

In the lighting apparatus according to the first embodiment, as illustrated in FIG. 3, the inclination angles $\theta_a(n)$, $\theta_b(n)$ of the light reflection parts $20a$, $20b$ are abruptly changed near the boundary between the region where the light reflection part $20a_1$ is formed and the region where the light reflection part $20a_2$ is formed and near the boundary between the region where the light reflection part $20b_1$ is formed and the region where the light reflection part $20b_2$ is formed. Accordingly, as illustrated in FIG. 5, regions where the light intensity becomes a little disuniform exist.

In the present embodiment, however, only the light reflection parts $20a_2$, $20b_2$ are formed on the reflection side of the linear light conductor 14 without forming the light reflection parts $20a_1$, $20b_1$, whereby, as illustrated in FIG. 7, places where the inclination angles $\theta_a(n)$, $\theta_b(n)$ of the light reflection parts are abruptly changed can be absent. Thus, the present embodiment can have a very uniform light intensity distribution as illustrated in FIG. 8.

(Modification)

Figure 9:
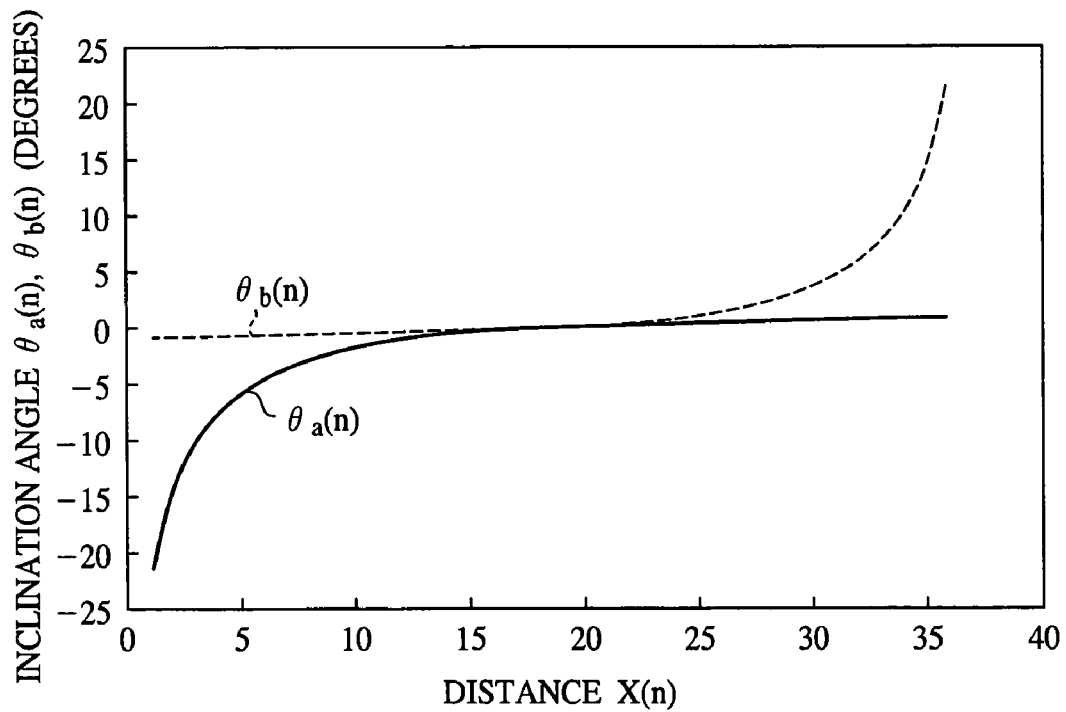
FIG. 9 is a graph exemplifying the inclination angles of the light reflection parts of the lighting apparatus according to a modification of the second embodiment of the present invention.

Next, the lighting apparatus according to a modification of the present embodiment will be explained with reference to FIGS. 6 and 9. FIG. 9 is a graph of examples of the inclination angles of the light reflection parts of the lighting apparatus according to the present modification.

First, the schematic structure of the lighting apparatus according to the present modification is the same as the structure of the lighting apparatus illustrated in FIG. 6, and its explanation is omitted.

The lighting apparatus according to the present modification is characterized mainly in that the formula for expressing inclination angles $\theta_a(n)$, $\theta_b(n)$ of the light reflection parts 20a, 20b are given by linear approximation, and based on the thus given formulas, respective inclination angles $\theta_a(n)$, $\theta_b(n)$ of the light reflection parts 20a, 20b are set.

In the lighting apparatus illustrated in FIG. 6, as illustrated in FIG. 7, the optical reflection parts 20b formed on the left side of the middle of the linear light conductor 14 as viewed in the drawing have linear changes of the inclination angles $\theta_b(n)$ with respect to changes of the distance $X(n)$.

In the lighting apparatus illustrated in FIG. 6, as illustrated in FIG. 7, the light reflection parts 20a formed on the right side of the middle of the linear light conductor 14 as viewed in the drawing have linear changes of the inclination angles $\theta_a(n)$ with respect to changes of the distance $X(n)$.

Thus, inclination angles $\theta_b(n)$ of the optical reflection parts 20b on the left side of the linear light conductor 14 as viewed in the drawing, and inclination angles $\theta_a(n)$ of the light reflection parts 20a on the right side of the linear light conductor 14 as viewed in the drawing can be expressed by the following approximation formula.

$$\theta_b(n) = A \times (\Delta L + X(n)) + C \quad (10)$$

In Formula 10, a value of A can be, e.g., 0.065, and a value of C can be e.g., −1.127.

With regard to inclination angles $\theta_b(n)$ of the light reflection parts 20b on the right side of the linear light conductor 14 as viewed in the drawing and inclination angles $\theta_a(n)$ of the light reflection parts 20a on the left side of the linear light conductor 14 as viewed in the drawing, changes of the inclination angles $\theta_a(n)$, $\theta_b(n)$ with respect to changes of the distance $X(n)$ are curved as illustrated in FIG. 7, whereby linear approximation is not suitable. Accordingly, respective inclination angles $\theta_b(n)$ of the light reflection parts 20b on the right side of the linear light conductor 14 as viewed in the drawing and respective inclination angles $\theta_a(n)$ of the light reflection parts 20a on the left side of the linear light conductor 14 as viewed in the drawing may be set in the same way as in the lighting apparatus illustrated in FIG. 6.

Next, examples of specific set values of the inclination angles $\theta_a(n)$, $\theta_b(n)$ of the light reflection parts $20a_2$, $20b_2$ of the present embodiment will be explained with reference to FIG. 9. FIG. 9 is a graph of the examples of the inclination angles $\theta_a(n)$, $\theta_b(n)$ of the light reflection parts which were given as described above. On the horizontal axis, distances $X(n)$ from the end surface of the linear light conductor 14 to the light reflection parts $20a_2$, $20b_2$ are taken, and inclination angles $\theta_a(n)$, $\theta_b(n)$ of the light reflecting parts $20a_2$, $20b_2$ are taken on the vertical axis.

As seen in FIG. 9, inclination angles $\theta_b(n)$ of the light reflection parts 20b on the left side of the linear light conductor 14 as viewed in the drawing and inclination angles $\theta_a(n)$ of the light reflection parts 20a on the right side of the linear light conductor 14 as viewed in the drawing have linear changes of inclination angles $\theta_a(n)$, $\theta_b(n)$ of the light reflection parts 20a, 20b with respect to changes of the distance $X(n)$.

As described above, according to the present embodiment, inclination angles $\theta_a(n)$, $\theta_b(n)$ of the light reflection parts 20a, 20b are set based on a formula given by linear approximation, whereby changes of the inclination angles $\theta_a(n)$, $\theta_b(n)$ of the light reflection parts 20a, 20b with respect to changes of the distance $X(n)$ can be made linear. Thus, according to the present embodiment, the cutting, etc. for forming the die for forming the linear light conductor 14, etc. can be made easy, which leads to low costs of the lighting apparatus.

(A Third Embodiment)

Figure 10:
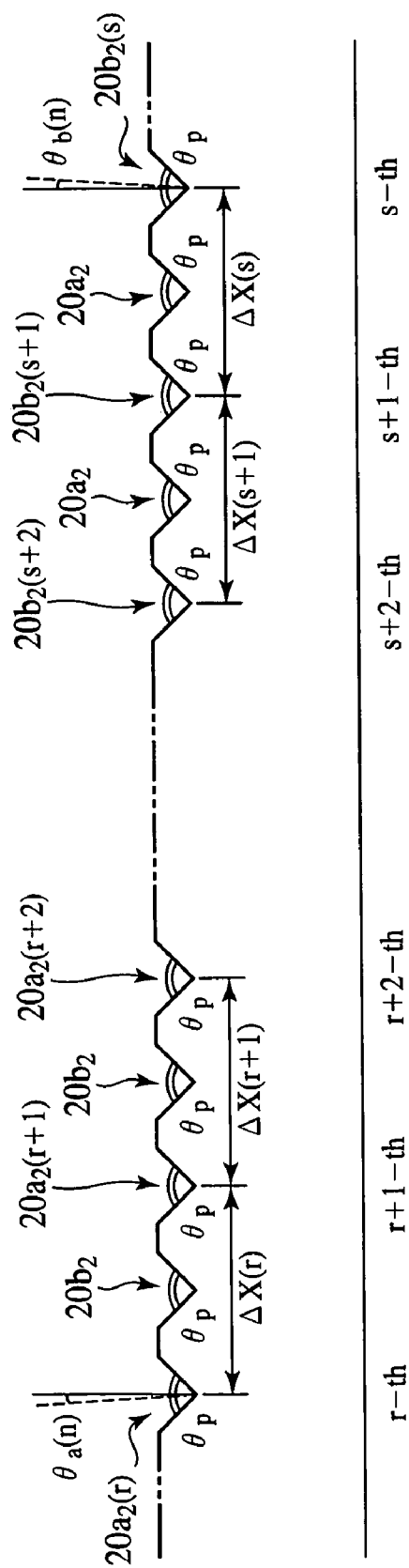
FIG. 10 is a plan view of the lighting apparatus according to a third embodiment of the present invention.
Figure 11:
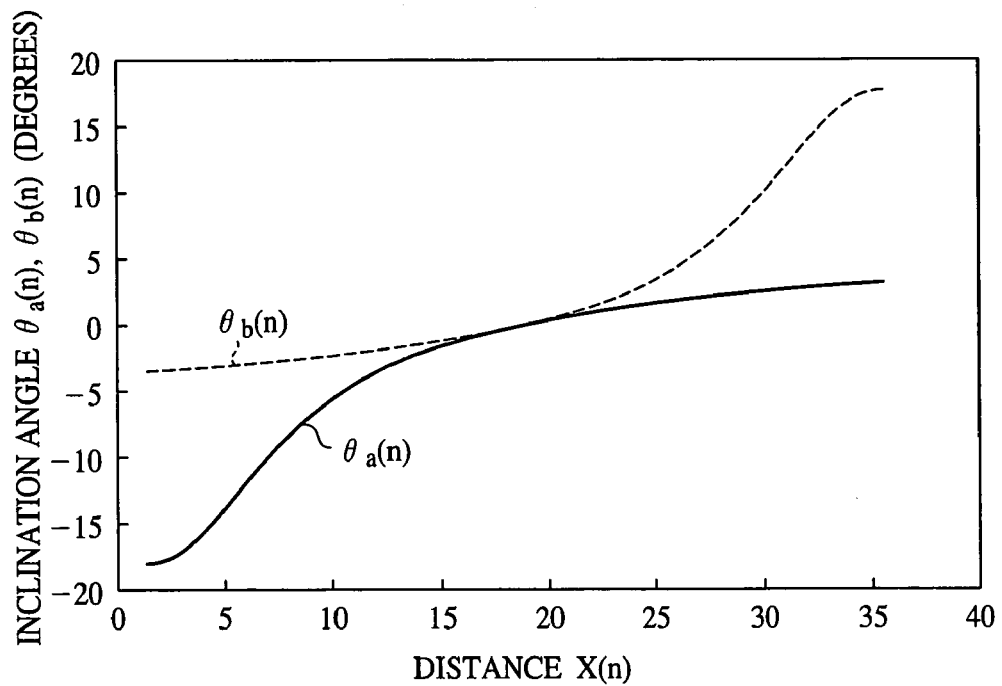
FIG. 11 is a graph exemplifying the inclination angles of the planes of the light reflection parts of the lighting apparatus according to the third embodiment of the present invention.

The lighting apparatus according to a third embodiment of the present invention will be explained with reference to FIGS. 10 and 11. FIG. 10 is a plan view of the lighting apparatus according to the present embodiment. FIG. 11 is a graph of inclination angles of the light reflection parts of the lighting apparatus according to the present embodiment. The same members of the present embodiment as those of the lighting apparatus according to the first or the second embodiment are represented by the same reference numbers not to repeat or to simplify their explanation.

A major characteristics of the lighting apparatus according to the present embodiment is that respective inclination angles $\theta_a(n)$, $\theta_b(n)$ of the light reflection parts $20a_2$, $20b_2$ are set so that changes of the inclination angles $\theta_a(n)$, $\theta_b(n)$ are smooth.

In the lighting apparatus according to the second embodiment described above, as seen in FIG. 7, the inclination angles $\theta_a(n)$ of the light reflection parts $20a_2$ on the left side of the linear light conductor 14 as viewed in the drawing are largely changed, and on the right side of the linear light conductor 14 as viewed in the drawings, the inclination angles $\theta_b(n)$ of the light reflection parts $20b_2$ are largely changed.

The changes of the inclination angles $\theta_a(n)$, $\theta_b(n)$ of the light reflection parts $20a_2$, $20b_2$ are made smoother, whereby the light intensity distribution can be made more uniform.

Then, in the present embodiment, the changes of the inclination angles $\theta_a(n)$, $\theta_b(n)$ of the light reflection parts $20a_2$, $20b_2$ are set to be smooth as follows.

Specifically, for the light reflection parts 20 which are the 20-th or less from the left side of the linear light conductor 14 as viewed in the drawing, inclination angles $\theta_a(n)$ of the light reflection parts $20a_2$ are set based on the following formula by method of least squares.

$$\theta_b(n) = \Sigma(A_i \times X(n)^i) \quad (11)$$

In Formula 11, a value of $A_0$ can be, e.g., 20.8898392176628, a value of $A_1$ can be, e.g., −0.933058715510982, a value of $A_2$ can be, e.g., 0.175935868714104, a value of $A_3$ can be, e.g., 0.0597356140982439, and a value of $A_4$ can be, e.g., −0.00616284917042891.

Respective inclination angles $\theta_a(n)$ of the light reflection parts $20a_2$ are set to satisfy also the following conditions.

That is, as illustrated in FIG. 10, respective inclination angles $\theta_a(n)$ of the light reflection parts $20a_2$ are set so that a distance between the r-th light reflection part $20a_{2(r)}$ and the r+1-th light reflection part $20a_{2(r+1)}$ from, e.g., the left side of the linear light conductor 14 as viewed in the drawing is $\Delta X$, a difference between an inclination angle $\theta_a(n)$ of the r-th light reflection part $20a_{2(r+1)}$ and the inclination angle $\theta_a(n)$ of the r+1-th light reflection part $20a_{2(r+1)}$ is $\Delta \theta_a$, an absolute value of $\Delta \theta_a/\Delta X$ is 2.71 degrees/mm or less.

In other words, respective inclination angles $\theta_L(n)$ of the planes of the light reflection parts $20a_2$ are set so that when a distance between the r-th light reflection part $20a_{2(r)}$ and the r+1-th light reflection part $20a_{2(r+1)}$ from, e.g., the left side of the linear light conductor 14 as viewed in the drawing is $\Delta X$, a difference between an inclination angle $\theta_a(n)$ of the r-th light reflection part $20a_{2(r+1)}$ and the inclination angle $\theta_a(n)$ of the r+1-th light reflection part $^{20}a_{2(r+1)}$ is $\Delta\theta_a$, an absolute value of $\Delta\theta_a/\Delta X$ is 2.71 degrees/mm or less.

For the light reflection parts $20b_2$ which are the 20th or less from the right side of the linear light conductor 14 as viewed in the drawing, inclination angles $\theta_b(n)$ of the light reflection parts $20b_2$ are set based on the formula using method of least squares, as in the above.

Respective inclination angles $\theta_b(n)$ of the light reflection parts $20b_2$ are set to satisfy also the following conditions.

That is, respective inclination angles $\theta_b(n)$ of the light reflection parts $20b_2$ are set so that a distance between the s-th light reflection part $20b_{2(s)}$ and the s+1-th light reflection part $20b_{2(s+1)}$ from, e.g., the right side of the linear light conductor 14 as viewed in the drawing is $\Delta X$, a difference between an inclination angle $\theta_b(n)$ of the s-th light reflection part $20b_{2(s+1)}$ and the inclination angle $\theta_b(n)$ of the s+1-th light reflection part $20b_{2(s+1)}$ is $\Delta\theta_b$, an absolute value of $\Delta\theta_b/\Delta X$ is 2.71 degrees/mm or less.

In other words, respective inclination angles $\theta_R(n)$ of the planes of the light reflection parts $20b_2$ are set so that when a distance between the s-th light reflection part $20b_{2(s)}$ and the s+1-th light reflection part $20b_{2(s+1)}$ from, e.g., the right side of the linear light conductor 14 as viewed in the drawing is $\Delta X$, a difference between an inclination angle $\theta_b(n)$ of the s-th light reflection part $20b_{2(s)}$ and the inclination angle $\theta_b(n)$ of the s+1-th light reflection part $20b_{2(s+1)}$ is $\Delta\theta_b$, an absolute value of $\Delta\theta_b/\Delta X$ is 2.71 degrees/mm or less.

For the light reflection parts $20a_2$, $20b_2$ other than the above, inclination angles $\theta_a(n)$, $\theta_b(n)$ are set in the same way as in the second embodiment.

Furthermore, in the present embodiment, respective inclination angles $\theta_a(n)$, $\theta_b(n)$ are set so that $\Delta\theta_a/\Delta X$, $\Delta\theta_b/\Delta X$ are set to be small, and also a change amount of $\Delta\theta_a/\Delta X$ and a change amount of $\Delta\theta_b/\Delta X$ can be small.

Respective inclination angles $\theta_a(n)$ of the light reflection parts $20a$ are set so that when a distance between the r-th light reflection part $20a_{2(r)}$ and the r+1-th light reflection part $20a_{2(r+1)}$ is $\Delta X_{(r)}$, a distance between the r+1-th light reflection part $20a_{2(r+1)}$ and the r+2-th light reflection part $20a_{2(r+2)}$ is $\Delta X_{(r+1)}$, a difference between an inclination angle $\theta_a(n)$ of the r-th light reflection part $20a_{2(r)}$ and an inclination angle $\theta_a(n)$ of the r+1-th light reflection part $20a_{2(r+1)}$ is $\Delta\theta_a(r)$, and a difference between an inclination angle $\theta_a(n)$ of the r+1-th light reflection part $20a_{2(r+1)}$ and an inclination angle $\theta_a(n)$ of the r+2-th light reflection part $20a_{2(r+2)}$ is $\Delta\theta_{a(r+1)}$, an absolute value of a difference between $\Delta\theta_{a(r)}/\Delta X_{(r)}$ and $\Delta\theta_{a(r+1)}/\Delta X_{(r+1)}$, i.e., an absolute value of a change amount of $\Delta\theta_a/\Delta X$ with respect to a distance in the longitudinal direction of the linear light conductor 14 is 0.70 degrees/mm or less.

In other words, respective inclination angles $\theta_L(n)$ of the light reflection parts $20a$ are set so that when a distance between the r-th light reflection part $20a_{2(r)}$ and the r+1-th light reflection part $20a_{2(r+1)}$ is $\Delta X_{(r)}$, a distance between the r+1-th light reflection part $20a_{2(r+1)}$ and the r+2-th light reflection part $20a_{2(r+2)}$ is $\Delta X_{(r+1)}$, a difference between an inclination angle $\theta_a(n)$ of the r-th light reflection part $20a_{2(r)}$ and an inclination angle $\theta_a(n)$ of the r+1-th light reflection part $20a_{2(r+1)}$ is $\Delta\theta_a(r)$, and a difference between an inclination angle $\theta_a(n)$ of the r+1-th light reflection part $20a_{2(r+1)}$ and an inclination angle $\theta_a(n)$ of the r+2-th light reflection part $20a_{2(r+2)}$ is $\Delta\theta_{a(r+1)}$, an absolute value of a difference between $\Delta\theta_{a(r)}/\Delta X_{(r)}$ and $\Delta\theta_{a(r+1)}/\Delta X_{(r+1)}$, i.e., an absolute value of a change amount of $\Delta\theta_a/\Delta X$ with respect to a distance in the longitudinal direction of the linear light conductor 14 is 0.70 degrees/mm or less.

Respective inclination angles $\theta_b(n)$ of the light reflection parts $20b$ are set so that when a distance between the s-th light reflection part $20b_{2(s)}$ and the s+1-th light reflection part $20b_{2(s+1)}$ is $\Delta X_{(s)}$, a distance between the s+1-th light reflection part $20b_{2(s+1)}$ and the s+2-th light reflection part $20b_{2(s+1)}$ is $\Delta X_{(s+1)}$, a difference between an inclination angle $\theta_b(n)$ of the s-th light reflection part $20b_{2(s)}$ and an inclination angle $\theta_b$ of the s+1-th light reflection part $20b_{2(s+1)}$ is $\Delta\theta_b(s)$, and a difference between an inclination angle $\theta_b(n)$ of the s+1-th light reflection part $20b_{2(s+1)}$ and an inclination angle $\theta_b(n)$ of the s+2-th light reflection part $20b_{2(s+2)}$ is $\Delta\theta_{b(s+1)}$, an absolute value of a difference between $\Delta\theta_{b(s)}/\Delta X_{(s)}$ and $\Delta\theta_{b(s+1)}/\Delta X_{(s+1)}$, i.e., an absolute value of a change amount of $\Delta\theta_b/\Delta X$ with respect to a distance in the longitudinal direction of the linear light conductor 14 is 0.70 degrees/mm or less.

In other words, respective inclination angles $\theta_R(n)$ of the light reflection parts $20b$ are set so that when a distance between the s-th light reflection part $20b_{2(s)}$ and the s+1-th light reflection part $20b_{2(s+1)}$ is $\Delta X_{(s)}$, a distance between the s+1-th light reflection part $20b_{2(s+1)}$ and the s+2-th light reflection part $20b_{2(s+2)}$ is $\Delta X_{(s+1)}$, a difference between an inclination angle $\Delta\theta_b(n)$ of the s-th light reflection part $20b_{2(s)}$ and an inclination angle $\theta_b(n)$ of the s+1-th light reflection part $20b_{2(s+1)}$ is $\Delta\theta_{b(s)}$, and a difference between an inclination angle $\theta_b(n)$ of the s+1-th light reflection part $20b_{2(s+1)}$ and an inclination angle $\theta_b(n)$ of the s+2-th light reflection part $20b_{2(s+2)}$ is $\Delta\theta_{b(s+1)}$ ran absolute value of a difference between $\Delta\theta_{b(s)}/\Delta X_{(s)}$ and $\Delta\theta_{b(s+1)}/\Delta X_{(s+1)}$, i.e., an absolute value of a change amount of $\Delta\theta_b/\Delta X$ with respect to a distance in the longitudinal direction of the linear light conductor 14 is 0.70 degrees/mm or less.

Next, examples of specific set values of the inclination angles $\theta_a(n)$, $\theta_b(n)$ of the light reflection parts $20a_2$, $20b_2$ of the present embodiment will be explained with reference to FIG. 11. FIG. 11 is a graph of the examples of the inclination angles $\theta_a(n)$, $\theta_b(n)$ of the light reflection parts of the lighting apparatus according to the present embodiment. On the horizontal axis, distances $X(n)$ from the end surface of the linear light conductor 14 to the light conductor bodies $20a_2$, $20b_2$ are taken, and inclination angles $\theta_a(n)$, $\theta_b(n)$ of the light reflecting parts $20a_2$, $20b_2$ are taken on the vertical axis.

As seen in FIG. 11, in the present embodiment, changes of the inclination angles $\theta_a(n)$, $\theta_b(n)$ of the light reflecting parts $20a_2$, $20b_2$ are smoother in comparison with those of the second embodiment.

As described above, according to the present embodiment, respective inclination angles $\theta_a(n)$, $\theta_b(n)$ of the light reflection parts $20a_2$, $20b_2$ are set so that changes of the inclination angles $\theta_a(n)$, $\theta_b(n)$ with respect to changes of a distance $X(n)$ are smooth, whereby the light intensity distribution can be more uniform.

(A Fourth Embodiment)

Figure 12:
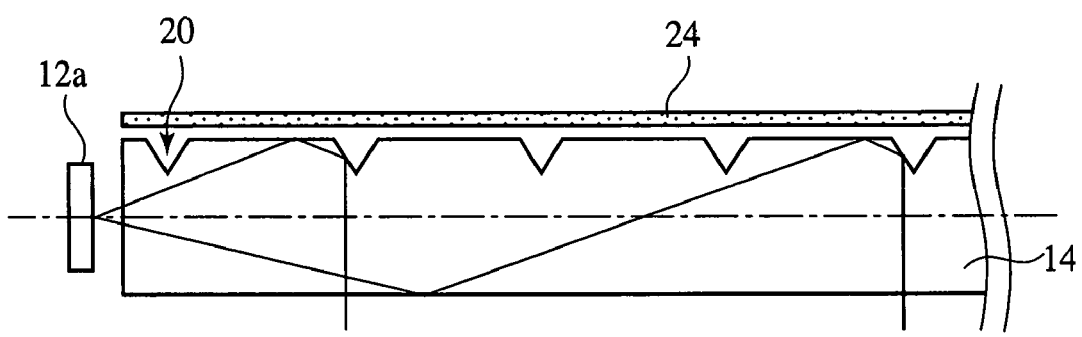
FIG. 12 is a plan view of the lighting apparatus according to a fourth embodiment of the present invention.

The lighting apparatus according to a fourth embodiment of the present invention will be explained with reference to FIG. 12. FIG. 12 is a plan view of the lighting apparatus according to the present embodiment. The same members of the present embodiment as those of the lighting apparatus according to the first to the third embodiments illustrated in FIGS. 1 to 10 are represented by the same reference numbers so as not to repeat their explanation.

The lighting apparatus according to the present embodiment is characterized mainly in that reflection means 24 which is independent of a linear light conductor 14 is provided on the reflection side of the linear light conductor 24, i.e., the side where light reflection parts 20 are formed.

As illustrated in FIG. 12, the reflection means 24 which is independent of the linear light conductor 14 is disposed on the reflection side of the linear light conductor 14. The reflection means 24 can be a holder of aluminum or the like, which covers at least the reflection side of the linear light conductor 14.

In the first to the third embodiments, a reflection coat film 20 is formed on the reflection side of the linear light conductor 14, whereby light is prevented from leaking outside at the reflection side of the linear light conductor 14. In the present embodiment, however, light which has leaked at the reflection side of the linear light conductor 14 is returned into the linear light conductor 14 by the reflection means 24 provided independently of the linear light conductor 14.

By the reflection means 24 provided in place of the reflection coat film 20, light which has leaked at the reflection side of the linear light conductor 14 can be returned into the linear light conductor 14, whereby the illumination is prevented from darkening.

As described above, it is not essential that the reflection coat film 20 is formed on the reflection side of the linear light conductor 14, and, as in the present embodiment, the reflection means 24 may be provided independently of the linear light conductor 14.

(A Fifth Embodiment)

Figure 13:
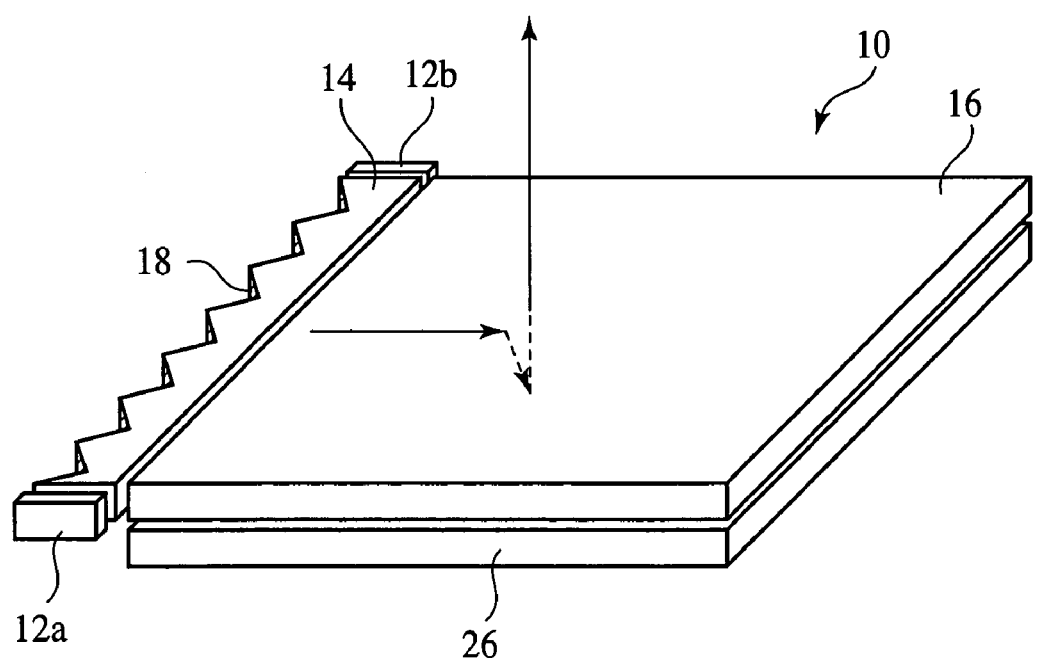
FIG. 13 is a perspective view of the liquid crystal display according to a fifth embodiment of the present invention.

The liquid crystal display according to a fifth embodiment of the present invention will be explained with reference to FIG. 13. FIG. 13 is a perspective view of the liquid crystal display according to the present embodiment. The same members of the present embodiment as those of the lighting apparatus according to the fist to the fourth embodiments are represented by the same reference numbers so as not to repeat their explanation.

The liquid crystal display according to the present embodiment is a combination of the lighting apparatus according to any one of the first to the fourth embodiments and a reflection type liquid crystal panel.

As illustrated in FIG. 13, the lighting apparatus 10 according to any one of claims 1 to 14 is disposed on a reflection type liquid crystal panel 26.

Light exiting from the linear light conductor 14 of the lighting apparatus 10 enters the reflection type liquid crystal panel 26 via a planar light conductor 16, is reflected on a mirror (not shown) disposed in the reflection type liquid crystal panel 26 and is watched by the eyes of a person. In the present embodiment, the lighting apparatus 10 functions as a front light.

The present embodiment uses the lighting apparatus according to any one of the first to the fourth embodiments, whereby the reflection type liquid crystal panel can be illuminated with a uniform light intensity. Thus, according to the present embodiment, the liquid crystal display can have good display characteristics.

(A Sixth Embodiment)

Figure 14:
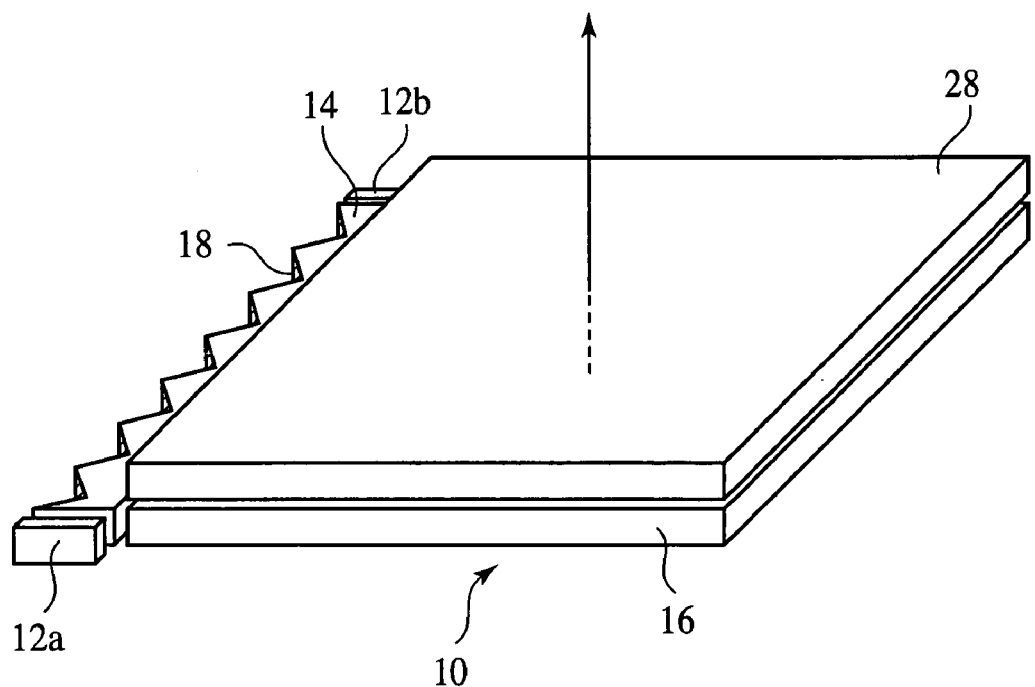
FIG. 14 is a perspective view of the liquid crystal display according to a sixth embodiment of the present invention.
Figure 15A:
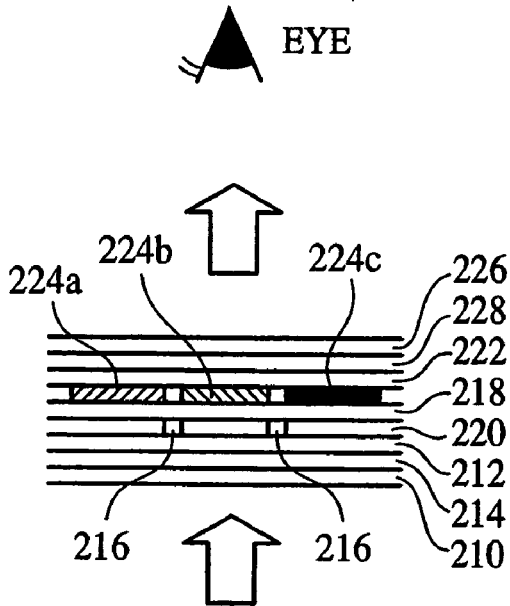
FIGS. 15A and 15B are sectional views of the transmission type liquid crystal panel and the reflection type liquid crystal panel.
Figure 15B:
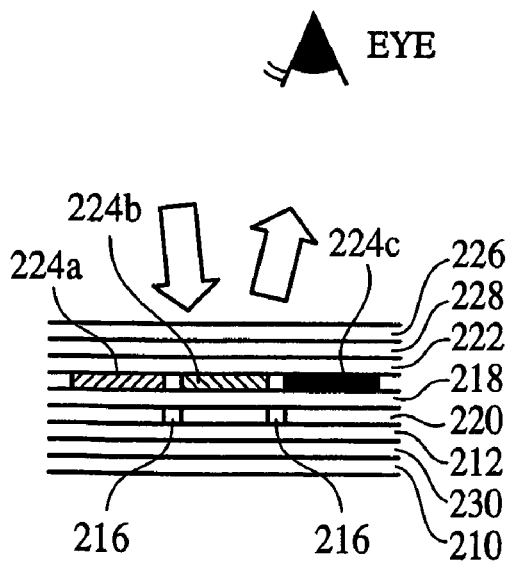
Figure 16:
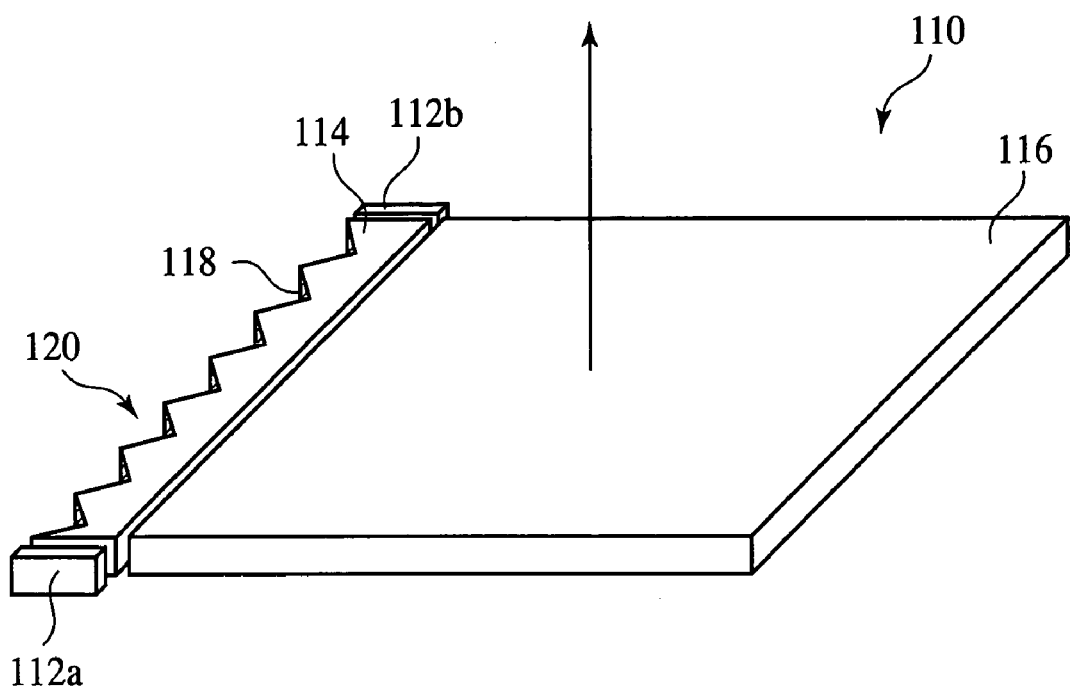
FIG. 16 is a perspective view of the proposed lighting apparatus.
Figure 17A:
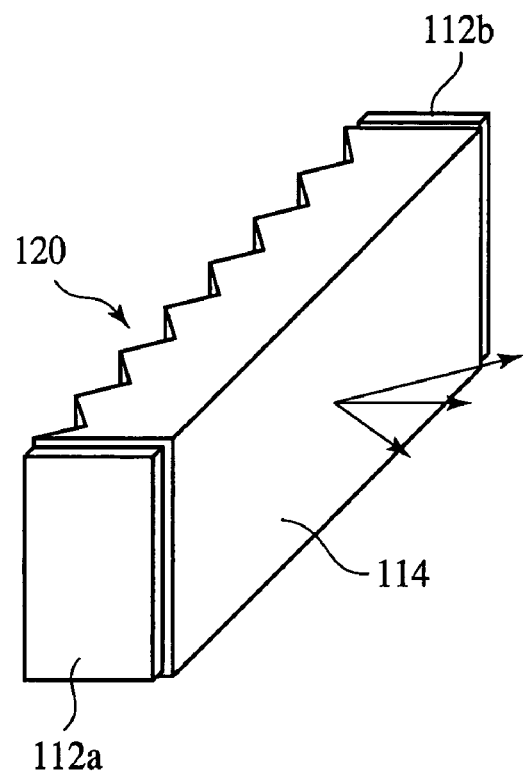
FIGS. 17A and 17B are a perspective view and a plan view of the linear light conductor of the proposed lighting apparatus.
Figure 17B:
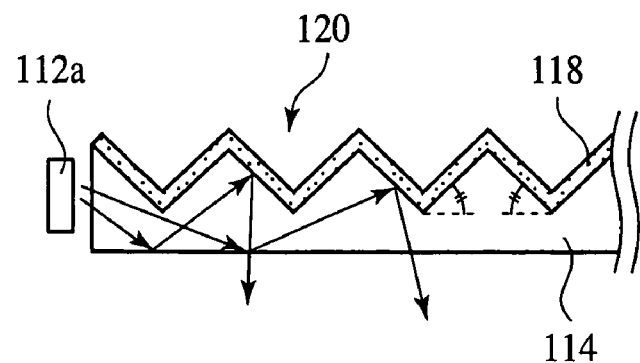
Figure 18:
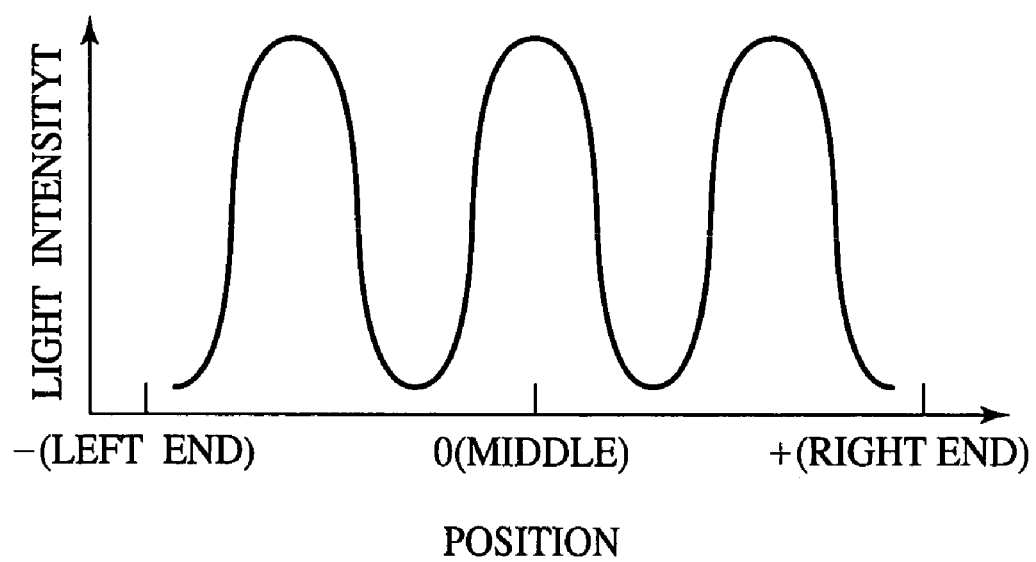
FIG. 18 is a graph of the intensity distribution of the light exiting from the linear light conductor of the proposed lighting apparatus.

The liquid crystal display according to a sixth embodiment of the present invention will be explained with reference to FIG. 14. FIG. 14 is a perspective view of the liquid crystal display according to the present embodiment. The same members of the present embodiment as those of the lighting apparatus, etc. according to the first to the fifth embodiments illustrated in FIGS. 1 to 13 are represented by the same reference numbers so as not to repeat their explanation.

The liquid crystal display according to the present embodiment is a combination of the lighting apparatus according to any one of the first to the fifth embodiments and a transmission type liquid crystal panel.

As illustrated in FIG. 14, a transmission type liquid crystal panel 28 is disposed on the lighting apparatus 10 according to any one of the first to the fourth embodiments.

Light exiting from the linear light conductor 14 enters the transmission type liquid crystal panel 28 via a planar light conductor 16, transmitting the transmission type liquid crystal panel 28 to be watched by a person.

Thus, according to the present embodiment, the liquid crystal display using the transmission type liquid crystal display can have good display characteristics.

(Modified Embodiments)

The present invention is not limited to the above-described embodiments and can cover other various modifications.

For example, in the above-described embodiments, the inclination angles of the light reflection parts are set so that light exits in the direction perpendicular to the longitudinal direction of the linear light conductor but may not be essentially set to be perpendicular to the longitudinal direction of the linear light conductor. For example, angles of the inclination angles of the light reflection parts may be set so that exit light is converged to the eyes of a watching person. Angles of the inclination angles of the light reflection parts may be set to a little scatter light. In short, inclination angles of the light reflection parts are set so that light exits substantially perpendicularly to the longitudinal direction of the linear light conductor, whereby good display characteristics can be provided.

In the above-described embodiments, the right reflection parts 20a for reflecting the light from the LED 12a and the light reflection parts 20b for reflecting the light from the LED 12b are alternately formed but may not be formed precisely alternately. For example, two light reflection parts 20a may be formed adjacent to each other, one light reflection part 20b may be formed adjacent to them, one light reflection part 20a may be further formed adjacent to it, two light reflection parts 20b may be further formed adjacent to it. Two light reflection parts 20a and two light reflection parts 20b may be alternately formed. That is, the light reflection parts 20a and the light reflection parts 20b may be formed substantially alternately.

Near the LED 12a, the light reflection parts 20a for reflecting the light from the LED 12a are not disposed, but the light reflection parts 20b for reflecting the light from the LED 12b may be disposed. Near the LED 12b, the light reflection parts 20b for reflecting the light from the LED 12b are not disposed, but the light reflection parts 20a for reflecting the light from the LED 12a may be disposed. The light reflection parts 20b for reflecting the light from the LED 12b are formed at least near the LED 12a, and the light reflection parts 20a for reflecting the light from the LED 12a are disposed at least near the LED 12b, whereby a light intensity is prevented from lowering in the regions near the ends of the linear light conductor 14.

INDUSTRIAL APPLICABILITY

The present invention is suitable for lighting apparatus and liquid crystal display, more specifically, is useful for lighting apparatus which can illuminate with a uniform light intensity and liquid crystal display using the lighting apparatus, having good display characteristics.

The invention claimed is:

1. A lighting apparatus comprising a first light source, a second light source spaced from the first light source, and a linear light conductor disposed between the first light source and the second light source, for causing light entering from the first light source and the second light source to exit linearly from an exit side, on the reflection side of the linear light conductor, which is opposed to the exit side, a plurality of first light reflection parts in the form of first V-shaped grooves, for reflecting light entering from the first light source and a plurality of second light reflection parts in the form of second V-shaped grooves, for reflecting light entering from the second light source being formed, and an intersection angle of the planes of the first V-shaped groove and an intersection angle of the planes of the second V-shaped grooves being substantially equal to each other, a plurality of the first reflection planes which are respective ones of the planes of the first V-shaped grooves, which are on the side of the first light source, being tilted at respective angles at which the light entering from the first light source exits in the direction substantially perpendicular to the longitudinal direction of the linear light conductor, and an intersection angle of the planes of the first V-shaped grooves being substantially equal to each other, a plurality of the second reflection planes which are respective ones of planes of the second V-shaped grooves, which are on the side of the second light source, being tilted at respective angles at which the light entering from the second light source exits in the direction substantially perpendicular to the longitudinal direction of the linear light conductor, an intersection angle of the planes of the second V-shaped grooves being substantially equal to each other, and the intersection angle of the planes of the first V-shaped grooves and the intersection angle of the planes of the second V-shaped grooves being substantially equal to each other, and said plurality of first light reflection parts being formed in at least a region near the end of the linear light conductor, opposite to the end thereof near which the first light source is disposed, and said plurality of second reflection parts being formed in at least a region near the end of the linear light conductor opposite to the end thereof near which the second light source is disposed.

2. A lighting apparatus according to claim 1, wherein the first light reflection parts and the second light reflection parts are formed substantially alternately.

3. A lighting apparatus according to claim 1, wherein the planes of said plurality of the first light reflection parts are respectively tilted so that when a pitch of the first light reflection parts adjacent to each other is $\Delta X$, and a change of the inclination angles is $\Delta\theta$, an absolute value of $\Delta\theta/\Delta X$ is 2.71 degrees/mm or less.

4. A lighting apparatus according to claim 3, wherein the planes of said plurality of first light reflection parts are respectively titled so that an absolute value of a change amount of $\Delta\theta/\Delta X$ with respect to a longitudinal distance of the linear light conductor is 0.70 degrees/mm or less.

5. A lighting apparatus according to any one of claims 1 to 4, further comprising
a planar light conductor optically connected to the linear light conductor, for emitting light entering from the linear light conductor in plane.

6. A lighting apparatus according to claim 1, further comprising
a reflection coat film formed on the reflection side of the linear light conductor.

7. A lighting apparatus according to claim 1, wherein
a reflector is disposed on the reflection side of the linear light conductor independent of the linear light conductor.

8. A liquid crystal display comprising a lighting apparatus including a first light source, a second light source spaced from the first light source, a linear light conductor disposed between the first light source and the second light source, for causing light entering from the first light source and the second light source to exit linearly from an exit side, and a planar light conductor optically connected to the linear light conductor, for emitting light entering from the linear light conductor in plane; and a liquid crystal panel illuminated by the lighting apparatus, on the reflection side of the linear light conductor, which is opposed to the exit side, a plurality of first light reflection parts in the form of first V-shaped grooves, for reflecting light entering from the first light source and a plurality of light reflection parts in the form of second V-shaped grooves, for reflecting light entering from the second light source being formed, and an intersection angle of the planes of the first V-shaped groove and an intersection angle of the planes of the second V-shaped grooves being substantially equal to each other, the planes of said plurality of first light reflection parts being tilted at respective angles at which the light entering from the first light source exits in the direction substantially perpendicular to the longitudinal direction of the linear light conductor, and the planes of said plurality of second light reflection parts being tilted at respective angles at which the light entering from the second light source exits in the direction substantially perpendicular to the longitudinal direction of the linear light conductor, and said plurality of first light reflection parts being formed in at least a region near the end of the linear light conductor, opposite to the end thereof near which the first light source is disposed, and said plurality of second reflection parts being formed in at least a region near the end of the linear light conductor opposite to the end thereof near which the second light source is disposed.

* * * * *